(12) United States Patent
Bliss et al.

(10) Patent No.: US 10,387,392 B2
(45) Date of Patent: Aug. 20, 2019

(54) METHOD TO AUTOMATE HISTORIAN CONFIGURATION USING CONTROLLER BASED TAG META ATTRIBUTE

(71) Applicant: Rockwell Automation Technologies, Inc., Mayfield Heights, OH (US)

(72) Inventors: Ronald E. Bliss, Twinsburg, OH (US); Anthony Carrara, Strongsville, OH (US); Bruce T. McCleave, Jr., Mission Viejo, CA (US); David P. Rapini, Stow, OH (US); Michael John Pantaleano, Willoughby, OH (US); Brian Alan Porter, Novelty, OH (US); Guangwen Sun, Dalian (CN); David Robert Curry, Lyndhurst, OH (US); Ryan Cahalane, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 524 days.

(21) Appl. No.: 15/156,823

(22) Filed: May 17, 2016

(65) Prior Publication Data

US 2017/0337226 A1 Nov. 23, 2017

(51) Int. Cl.
*G06F 16/22* (2019.01)
*H04L 29/08* (2006.01)
(Continued)

(52) U.S. Cl.
CPC ............ *G06F 16/22* (2019.01); *G06F 16/185* (2019.01); *G06F 16/907* (2019.01); *G06F 16/955* (2019.01); *H04L 67/1097* (2013.01)

(58) Field of Classification Search
CPC .............. G06F 17/30997; G06F 8/316; G06F 11/3476; G06F 11/3485; G06F 11/2268
(Continued)

(56) References Cited

U.S. PATENT DOCUMENTS 5,980,078 A * 11/1999 Krivoshein ...... G05B 19/41865
700/1
7,809,656 B2 10/2010 Baier et al.
(Continued)

FOREIGN PATENT DOCUMENTS

CN 102449628 A 5/2012
CN 104717276 A 6/2015
CN 104754007 A 7/2015

OTHER PUBLICATIONS

Extended European Search Report for Application Serial No. EP17169528.1 dated Oct. 12, 2017, 11 pages.
(Continued)

*Primary Examiner* — Robert W Beausoliel, Jr.
*Assistant Examiner* — Arthur Ganger
(74) *Attorney, Agent, or Firm* — Amin, Turocy & Watson, LLP

(57) ABSTRACT

An industrial control program development system allows a user to set metadata attributes for respective data items in the controller that indicate which of the data tags are to be monitored and collected by a separate industrial data historian system. When the industrial controller is deployed on a plant network, the data historian system reads the metadata attributes for the respective data items (e.g., data tags or data logs) defined in the controller and configures itself to collect and store data associated with the subset of data items that have been flagged for data collection. This system mitigates the need to manually configure the data historian with the identities of the data items that are to be monitored and collected for historical or reporting purposes.

20 Claims, 17 Drawing Sheets

(51) Int. Cl.
*G06F 16/185* (2019.01)
*G06F 16/907* (2019.01)
*G06F 16/955* (2019.01)

(58) Field of Classification Search
USPC .......................................................... 707/812
See application file for complete search history.

(56) References Cited

U.S. PATENT DOCUMENTS

| | | | | |
|---|---|---|---|---|
| 8,689,120 | B2* | 4/2014 | McGreevy | G05B 19/409 |
| | | | | 715/762 |
| 2007/0142941 | A1* | 6/2007 | McGreevy | G06Q 10/00 |
| | | | | 700/83 |
| 2009/0300021 | A1 | 12/2009 | Vasko et al. | |
| 2013/0124575 | A1* | 5/2013 | Plache | G05B 19/0423 |
| | | | | 707/800 |
| 2014/0282227 | A1* | 9/2014 | Nixon | G06F 17/5009 |
| | | | | 715/786 |
| 2014/0343696 | A1* | 11/2014 | Plache | G05B 19/0426 |
| | | | | 700/83 |
| 2015/0277406 | A1 | 10/2015 | Maturana et al. | |
| 2015/0319227 | A1* | 11/2015 | Lie | H04L 67/10 |
| | | | | 709/202 |
| 2015/0341469 | A1 | 11/2015 | Lawson et al. | |

OTHER PUBLICATIONS

First Office Action received for Chinese Patent Application Serial No. 201710339403.2 dated Apr. 17, 2019, 18 pages (including English Translation).

* cited by examiner

METHOD TO AUTOMATE HISTORIAN CONFIGURATION USING CONTROLLER BASED TAG META ATTRIBUTE

BACKGROUND

The subject matter disclosed herein relates generally to industrial automation systems, and, more particularly, to systems and methods for configuring industrial controller data tags for historian data collection using controller-side tag metadata attributes.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for collecting and storing industrial data is provided, comprising a network interface component configured to establish data communication with one or more industrial controllers via a network connection; a data collection component configured to read, from the one or more industrial controllers via the network connection, data values associated with data items defined on the industrial controllers and store the data values in the memory, wherein the data items comprise at least one of data tags or data logs; and a metadata identification component configured to read, via the network connection, data item information from an industrial controller of the one or more industrial controllers, wherein the data item information identifies a set of data items defined on the industrial controller, read, from the industrial controller via the network connection, historize metadata attributes respectively associated with the set of data items, identify a subset of the data items having an associated historize metadata attribute that is set to a value indicating that data collection is enabled, and configure, based on the historize metadata attributes, the data collection component to collect and store data from the subset of the data items.

Also, one or more embodiments provide a method for configuring an industrial data historian, comprising establishing, by a data historian system comprising at least one processor, data communication with one or more industrial controllers via a network connection; obtaining, by the data historian system via the network connection, data item information from an industrial controller of the one or more industrial controllers, wherein the data item information identifies a set of data items defined on the industrial controller, and the set of data items comprise at least one of data tags or data logs; obtaining, from the industrial controller by the data historian system via the network connection, metadata respectively associated with the set of data items; determining, by the data historian system based on the metadata, a subset of the data items having an associated metadata attribute that is set to a value indicating that data collection is enabled; and updating, by the data historian system based on the metadata, a configuration of the data historian system to cause the data historian system to collect and store data associated with the subset of the data items.

Also, according to one or more embodiments, a non-transitory computer-readable medium is provided having stored thereon instructions that, in response to execution, cause a data historian system to perform operations, the operations comprising establishing data communication with one or more industrial controllers via at least one network device; reading, via the at least one network device, data item information from an industrial controller of the one or more industrial controllers, wherein the data item information identifies a set of data items defined on the industrial controller, and the data items comprise at least one of data tags or data logs; reading, from the industrial controller via the at least one network device, metadata respectively associated with the set of data items; identifying, based on the metadata, a subset of the data items having an associated metadata attribute that is set to a value indicating that data collection is enabled; and configuring, based on the metadata, the data historian system to collect and store data associated with the subset of the data items.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
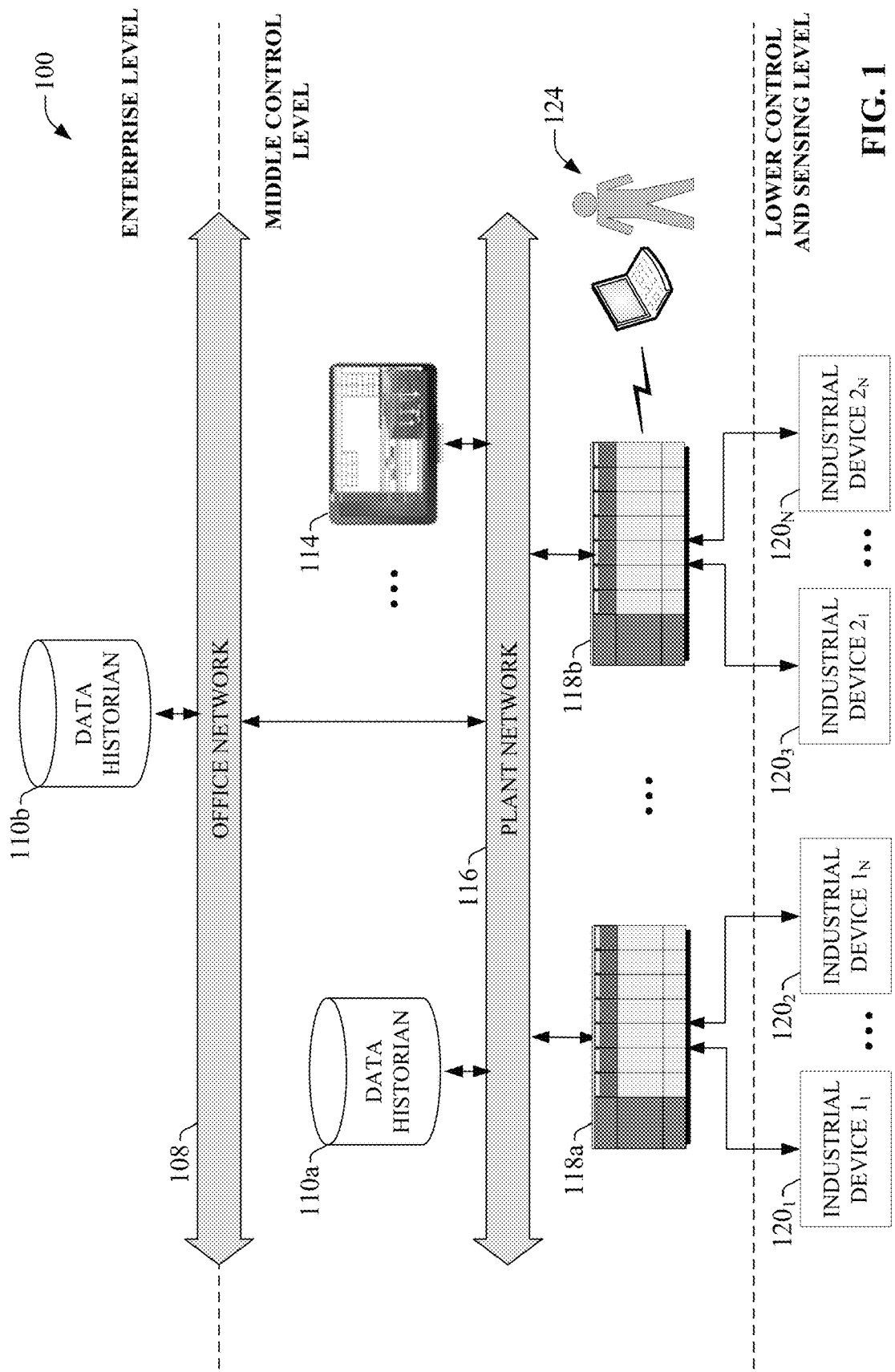
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

In many industrial enterprises, plant engineers or system administrators install and configure one or more data historians 110 to facilitate reporting, analysis, and record-keeping for the industrial processes carried out by controllers 118. These data historians 110 may reside on the same plant network 116 as the industrial devices (e.g., data historian 110a) or on an office network 108 securely linked to the plant network 108 (e.g., data historian 110b). Data historians 110 monitor selected data items or data tag values residing on the industrial controllers 118 (e.g., process variables, product counts, machine statuses, etc.) over the plant and/or office network and record the values in local historian data storage. Once aggregated in the data historian, the data can be viewed using a data visualization application, imported into a reporting or analysis tool, or otherwise viewed, processed, or manipulated.

Figure 2:
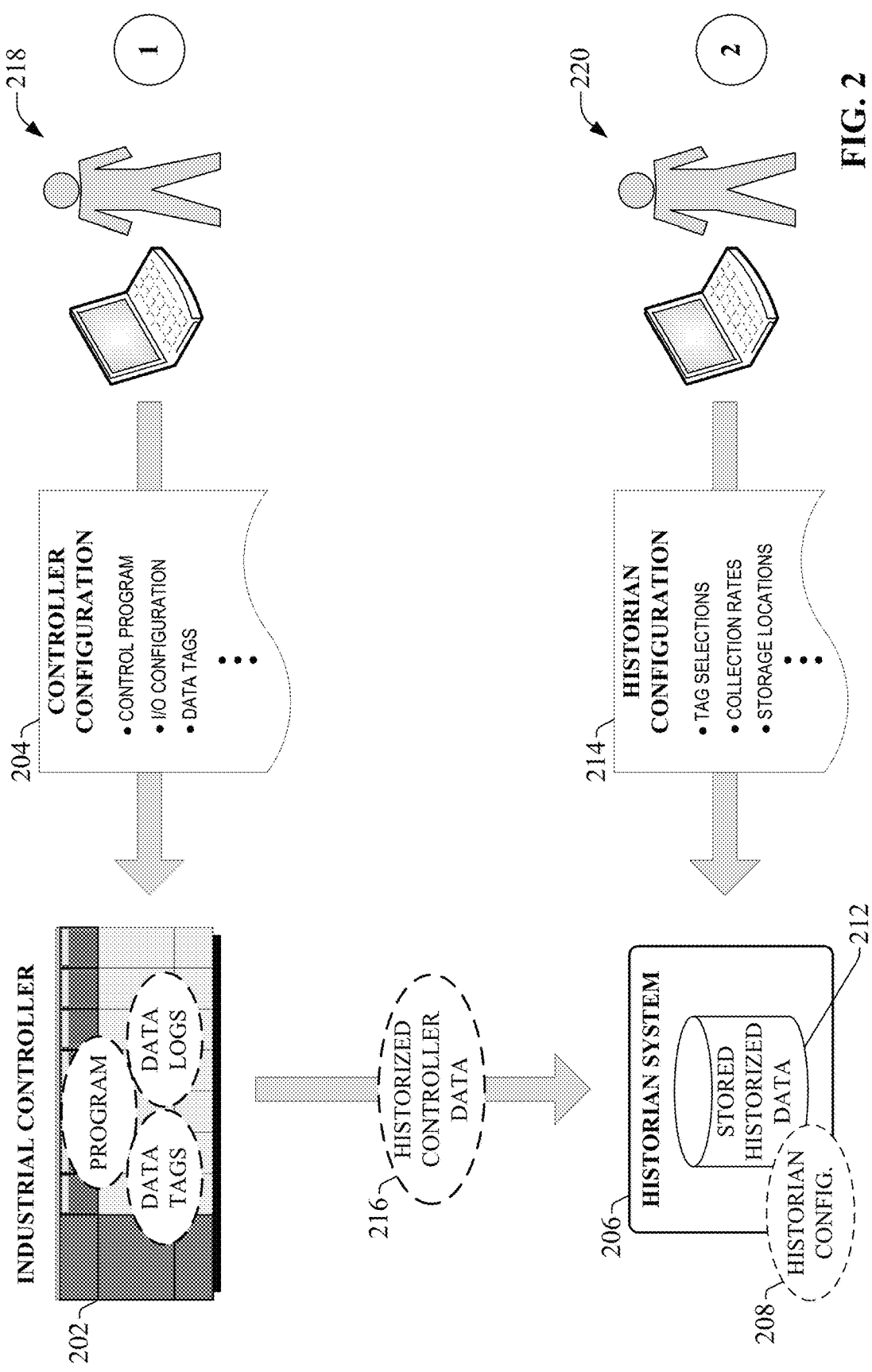
FIG. 2 is a diagram illustrating configuration of a data historian system to collect a set of selected data items on an industrial controller.

The particular data items to be collected and archived (or historized) by the data historian are selected and configured by a system administrator. The process of configuring a data historian is typically a distributed, multi-step process. FIG. 2 is a diagram illustrating configuration of a data historian system 206 to collect a set of selected data items on an industrial controller 202. Initially, an industrial control programmer 218 configures and programs industrial controller 202 using a program development application executing on the programmer's client device (e.g., laptop computer, desktop computer, tablet computer, etc.). Configuring and programming industrial controller 202 may involve defining the I/O modules and/or I/O points that will be used by the controller to exchange analog and digital data with the industrial devices on the plant floor (including but not limited to telemetry devices, safety devices, actuators, robot interface points, etc.), and developing and downloading the industrial control program—e.g., ladder logic program, sequential function chart, etc.—that will be executed by the industrial controller 202. Development of the control program also requires the programmer 218 to define the analog and digital data tags that will store the input, output, and local data items read or generated by the industrial controller 202. The programmer downloads this controller configuration information 204—comprising the I/O configuration, control program, and data tag definitions—to the industrial controller 202. During execution, the controller 202 will execute the industrial control program and locally update the values of the associated data tags in accordance with the control program and the statuses of the field devices with which the industrial controller communicates.

In a separate historian configuration process, a historian administrator 220 (who may be the controller programmer or another administrator responsible for plant-wide data collection) must configure historian system 206 to collect a selected subset of the data tag values stored and updated on the industrial controller 202. This may involve interfacing with the historian system 206 using a separate historian configuration application, and defining or selecting the subset of the available data tags that are to be monitored and collected. Some historian systems may include configuration tools that allow the user to remotely browse the set of defined data tags on the industrial controller (e.g., via a networked connection between historian system 206 and industrial controller 202) and select the desired subset of data tags to be collected. Using the historian configuration application, the user may also set a number of data collection attributes, such as collection rates for individual data tags or groups of tags, storage folder locations for the archived data, upper and/or lower limits on the tag values to be used as filtering criteria, or other such attributes. This historian configuration information 214 is provided to the historian system 206, which stores one or more historian configuration files 208 based on the configuration information. This stored historian configuration information is used by the historian system 206 to perform data collection of the selected data tags in accordance with the user-defined preferences. During operation, the historian system 206 collects the controller data 216 to be historized and stores the data in local historian storage in accordance with the historian configuration.

As demonstrated by this example process, configuration of an industrial data historian requires one or more users to perform separate configuration steps on the industrial controller and on the data historian itself. That is, a user must first create and define the data tags to be used in the industrial controller, and then move to the historian system in order to browse for, locate, and select the data tags to be historized. This distributed configuration technique also places a burden on the system administrator to keep the configurations synchronized between the industrial controller and historian environments. For example, if a historized data tag is added to or deleted from the industrial controller, the user must then separately update the configuration on the historian system to add or remove the data tag from the collection list. Moreover, if a single historian system is responsible for collecting data from multiple distributed controllers within a plant environment, the administrator must keep the centralized historian configuration synchronized with the multiple distributed controllers, which can be both daunting and prone to error.

To address these and other issues, one or more embodiments of the present disclosure provide an industrial control program development system that allows a program developer to select data tags within the program development environment for historian data collection. In one or more embodiments, the program development environment allows the user to define data tags that are to contain respective input, output, or locally generated analog and digital data values in connection with execution of the industrial control program. In addition, the program development system allows the user to set metadata attributes for selected data tags indicating that the selected tags are to be historized by a separate data historian system. Thus, the system allows the program developer to select, during program development and within the controller environment, which data tags are to be collected by the historian system.

Once the data tags and associated metadata are defined on the controller side, complementary metadata detection features on the data historian system can read the data tags defined on the controller, determine which tags have an associated historian metadata attribute set, and add the tags having the appropriate metadata attribute set to the historian configuration. This mitigates the need for the user to separately interface with the data historian system, remotely browse the available tags defined within the controller from the historian environment, and select the desired data tags for data collection after the program has been downloaded to the industrial controller. In this way, data tags to be collected by the data historian can be set within the controller environment (or unset in the case of a data tag that is to be removed from the data collection set), and the data historian will automatically update its data collection configuration to reflect the controller-level metadata.

Figure 3:
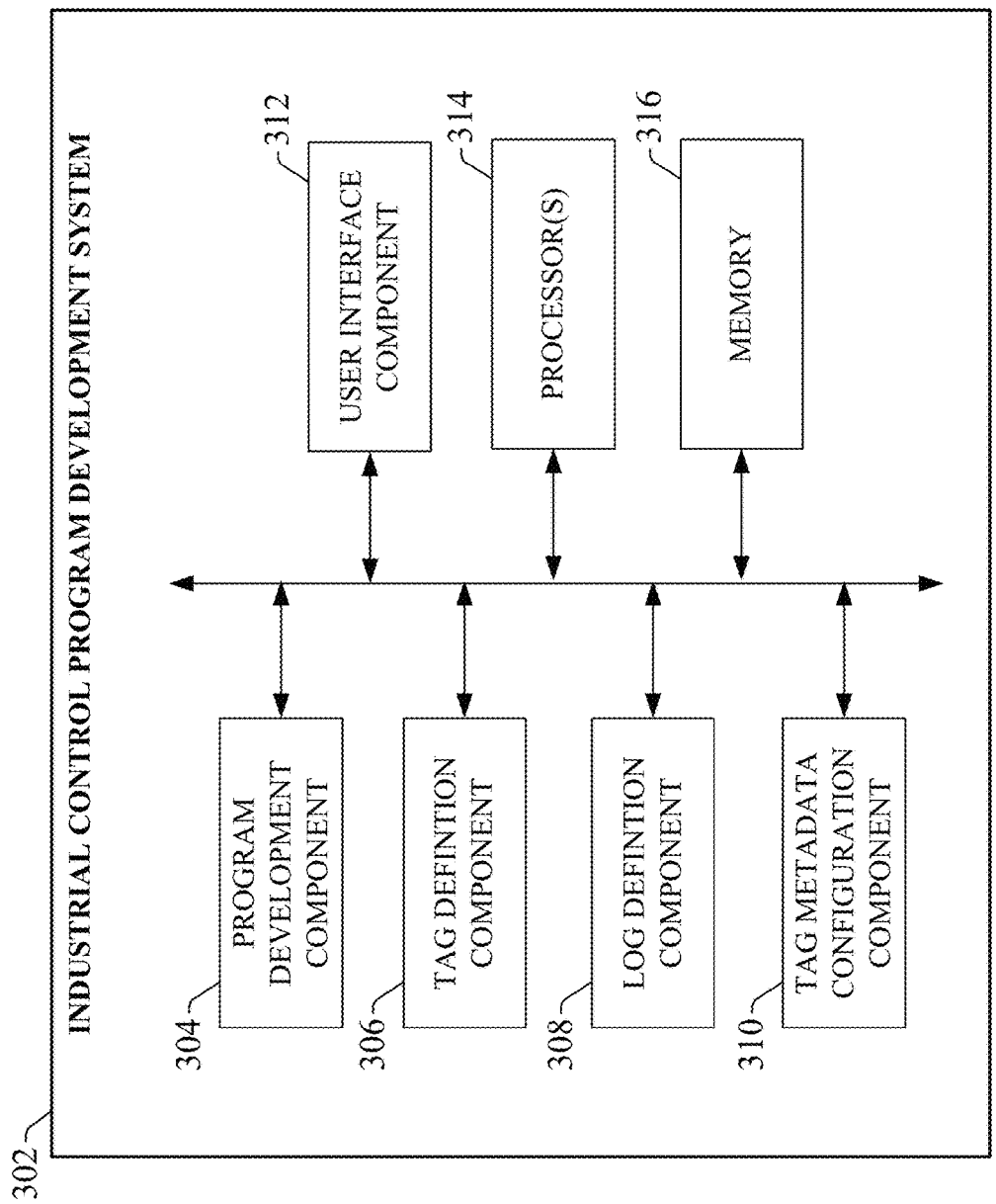
FIG. 3 is a block diagram of an example industrial control program development system.

FIG. 3 is a block diagram of an example industrial control program development system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial control program development system 302 can include a program development component 304, a tag definition component 306, a log definition component 308, a tag metadata configuration component 310, a user interface component 312, one or more processors 314, and memory 316. In various embodiments, one or more of the program development component 304, tag definition component 306, log definition component 308, tag metadata configuration component 310, user interface component 312, the one or more processors 314, and memory 316 can be electrically and/or communicatively coupled to one another to perform one or more of the functions of the industrial control program development system 302. In some embodiments, components 304, 306, 308, 310, and 312 can comprise software instructions stored on memory 316 and executed by processor(s) 314. Industrial control program development system 302 may also interact with other hardware and/or software components not depicted in FIG. 3. For example, processor(s) 314 may interact with one or more external user interface devices, such as a keyboard, a mouse, a display monitor, a touchscreen, or other such interface devices.

Program development component 304 can be configured to generate an industrial controller program in accordance with input provided by a user. In various embodiments, the program development component can support any suitable program development language, including but not limited to ladder logic programming, sequential function charts, structured text, or any other programming language suitable for developing industrial control programs. The tag definition component 306 can be configured to define one or more analog, digital, and/or string data tags to be used by the control program to hold analog or digital data items in conjunction with execution of the control program. The data tags are aliases for controller memory locations in which the corresponding data values will be stored. For example, some data tags may be defined that correspond to respective I/O points defined for the industrial controller to which the control program will be downloaded. Such I/O tags will hold the analog or digital values corresponding to the inputs read from respective analog or digital input modules associated with the controller, as well as the output values generated by the control program to be output via respective output points of the controller's output modules. Other tags may be used to store data that is generated by the control program for internal use, or for display on an associated visualization application.

Log definition component 308 can be configured to define one or more data logs on the industrial controller in accordance with log configuration input provided by a user. The data log definitions may define, for example, types of events that are to be recorded in a data log on the controller's local memory (e.g., alarm events, key performance indicator criteria, etc.), data tags whose values are to be logged by the controller periodically or in response to the values satisfying a criterion, or other such log configuration information.

Tag metadata configuration component 310 can be configured to set, for each defined data tag, metadata attributes that can be read and used by a separate data historian system to configure the historian's data collection settings. The metadata attributes can be set by the user via interaction with the development system's user interface. For example, the tag metadata configuration component 310 can allow the user to set a historize metadata attribute for a selected data tag indicating that the data tag is to be historized, or collected by the data historian system. In some embodiments, the tag metadata configuration component 310 may also allow the user to set one or more other data collection attributes for the data tag, including but not limited to a data collection rate, a storage folder or memory location within the historian system to which the tag's values are to be stored, maximum and/or minimum data tag values to be used as filtering criteria (e.g., such that the historian discards data values above the defined maximum or below the defined minimum), or other such data collection attributes. In addition to allowing the user to set historize metadata attributes for defined data tags, some embodiments of the tag configuration component 310 may also allow the user to set historize metadata attributes for data logs maintained on the industrial controller (e.g., alarm logs, diagnostic logs, etc.), such that records added to the data logs that are stored locally on the controller will also be collected on the historian system. Once the industrial control program has been developed, the data tags have been defined, and any associated metadata has been configured using components 304, 306, 308, and 310, these industrial control program development system 302 can download the collective programming, tag, and metadata information to the industrial controller. The development system 302 can also save the collective information as a control program file, which can be stored offline relative to the controller.

User interface component 312 can be configured to receive user input and to render output to the user in any suitable format (e.g., visual, audio, tactile, etc.). For example, the user interface component 312 can be configured to generate one or more program development screens on a client device (e.g., laptop computer, desktop computer, tablet computer, etc.) through which the user can build the industrial controller program, define the data tags and logs, and set tag metadata attributes.

The one or more processors 314 can perform one or more of the functions described herein with reference to the systems and/or methods disclosed. Memory 316 can be a computer-readable storage medium storing computer-executable instructions and/or information for performing the functions described herein with reference to the systems and/or methods disclosed.

Figure 4:
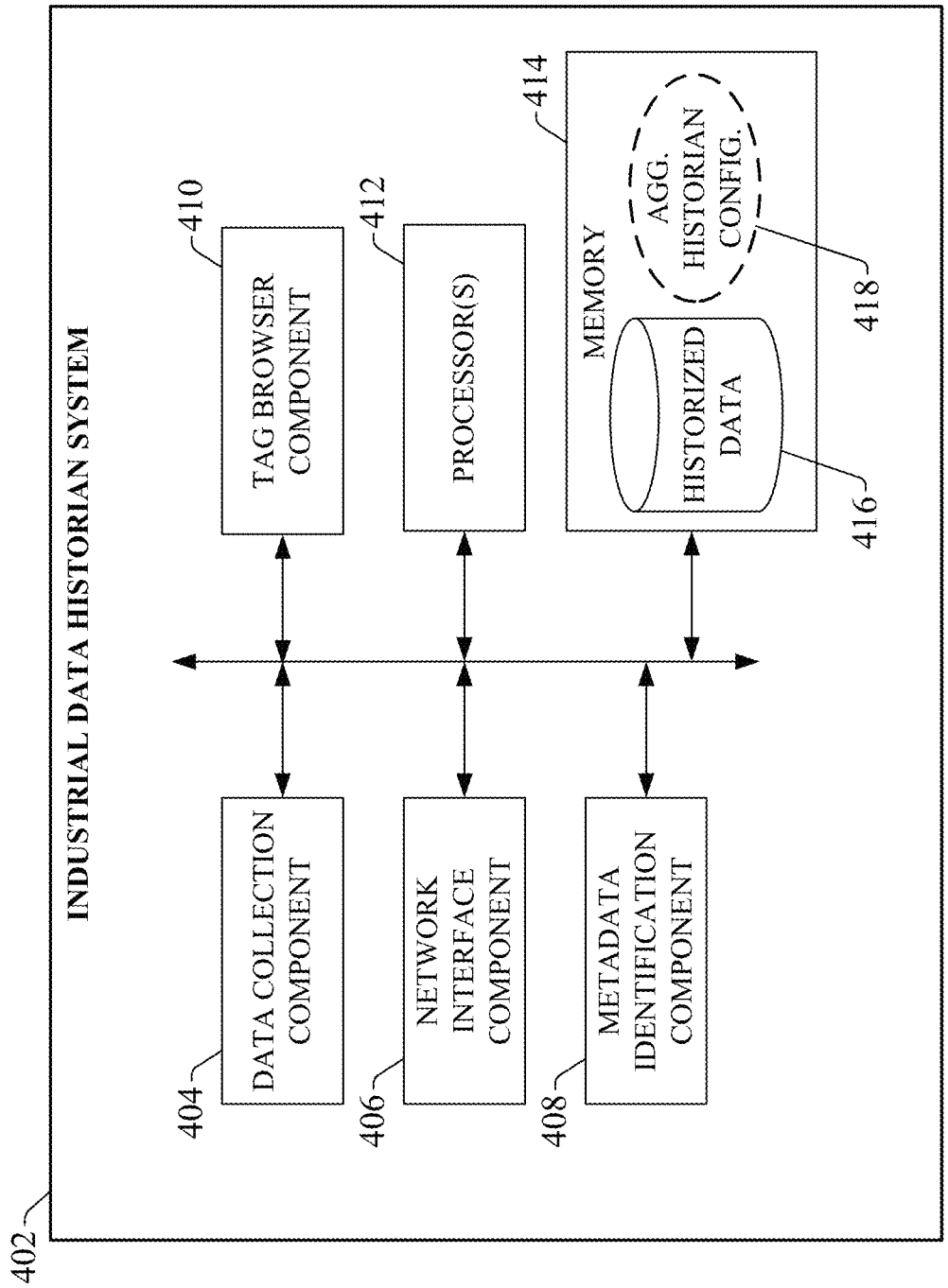
FIG. 4 is a block diagram of an example industrial data historian system.

FIG. 4 is a block diagram of an example industrial data historian system 402 according to one or more embodiments of this disclosure. In general, industrial data historian system 402 supports automatic data collection configuration based on detection and interpretation of data tag metadata discovered on one or more industrial controllers that have been programmed using industrial control program development system 302.

Industrial data historian system 402 can include a data collection component 404, a network interface component 406, a metadata identification component 410, a tag browser component 410, one or more processors 412, and memory 414. In various embodiments, one or more of the data collection component 404, network interface component 406, metadata identification component 408, tag browser component 410, the one or more processors 412, and memory 414 can be electrically and/or communicatively coupled to one another to perform one or more of the functions of the industrial data historian system 402. In some embodiments, components 404, 406, 408, and 410 can comprise software instructions stored on memory 414 and executed by processor(s) 412. Industrial data historian system 302 may also interact with other hardware and/or software components not depicted in FIG. 4. For example, processor(s) 412 may interact with one or more external user interface devices, such as a keyboard, a mouse, a display monitor, a touchscreen, or other such interface devices.

Data collection component 404 can be configured to monitor, via a wired or wireless network, data tags defined on one or more industrial controllers, and collect and store data values associated with the data tags in local historian data storage. For example, data collection component 404 can store the collected industrial data on memory 414 (or on one or more other memory devices associated with the historian system) as historized data 416. The data collection component 404 can determine which of the available data tags or data logs on the one or more industrial controller are to be collected, as well as other data collection attributes (e.g., data collection rates, storage preferences, etc.), based on aggregated historian configuration data 418 stored in association with the historian system (e.g., on memory 414). This aggregated historian configuration data 418 can define, among other configuration aspects, a namespace of available data tags located on one or more industrial controllers that are to be historized by data collection component 404.

The network interface component 406 can be configured to exchange data between the industrial data historian system 402 and one or more external devices (e.g., industrial controllers, client devices, etc.) over a wired or wireless network (e.g., via one or more network infrastructure devices). The metadata identification component 408 can be configured to locate or discover data tags or logs defined on one or more industrial controllers networked to the historian system 402 (e.g., via network interface component 406), and to identify which of the located data tags (or controller-based data logs) have an associated metadata attribute set to a value indicating that the data tags are to be monitored and historized (stored in memory for archival, reporting, or analytical purposes) by the data collection component 404. Based on the metadata attributes associated with one or more data tags, the metadata identification component 408 will update the aggregated historian configuration data 418 to reflect the metadata values. For example, upon discovering a new data tag on an industrial controller having the appropriate metadata attribute set—indicating that the data tag is to be historized—the metadata identification component 408 will add the identified data tag to the historian namespace defined by the historian configuration data 418. Based on this updated configuration, data collection component 404 will begin reading and storing the value of the data tag. In addition to the historize metadata attribute, the metadata identification component 408 may also be configured to identify other related historization metadata attributes associated with the data tag or controller-based data logs, including but not limited to a collection rate at which the data tag value should be collected, a preferred storage destination for the data tag values, or other such attributes. The metadata identification component 408 can further update the historian configuration data 418 based on the values of these related historization metadata attributes.

The tag browser component 410 can be configured to generate a user interface that allows the user to browse the list of tags that have been set as historized tags based on the metadata attributes. The one or more processors 412 can perform one or more of the functions described herein with reference to the systems and/or methods disclosed. Memory 414 can be a computer-readable storage medium storing computer-executable instructions and/or information for performing the functions described herein with reference to the systems and/or methods disclosed.

Figure 5:
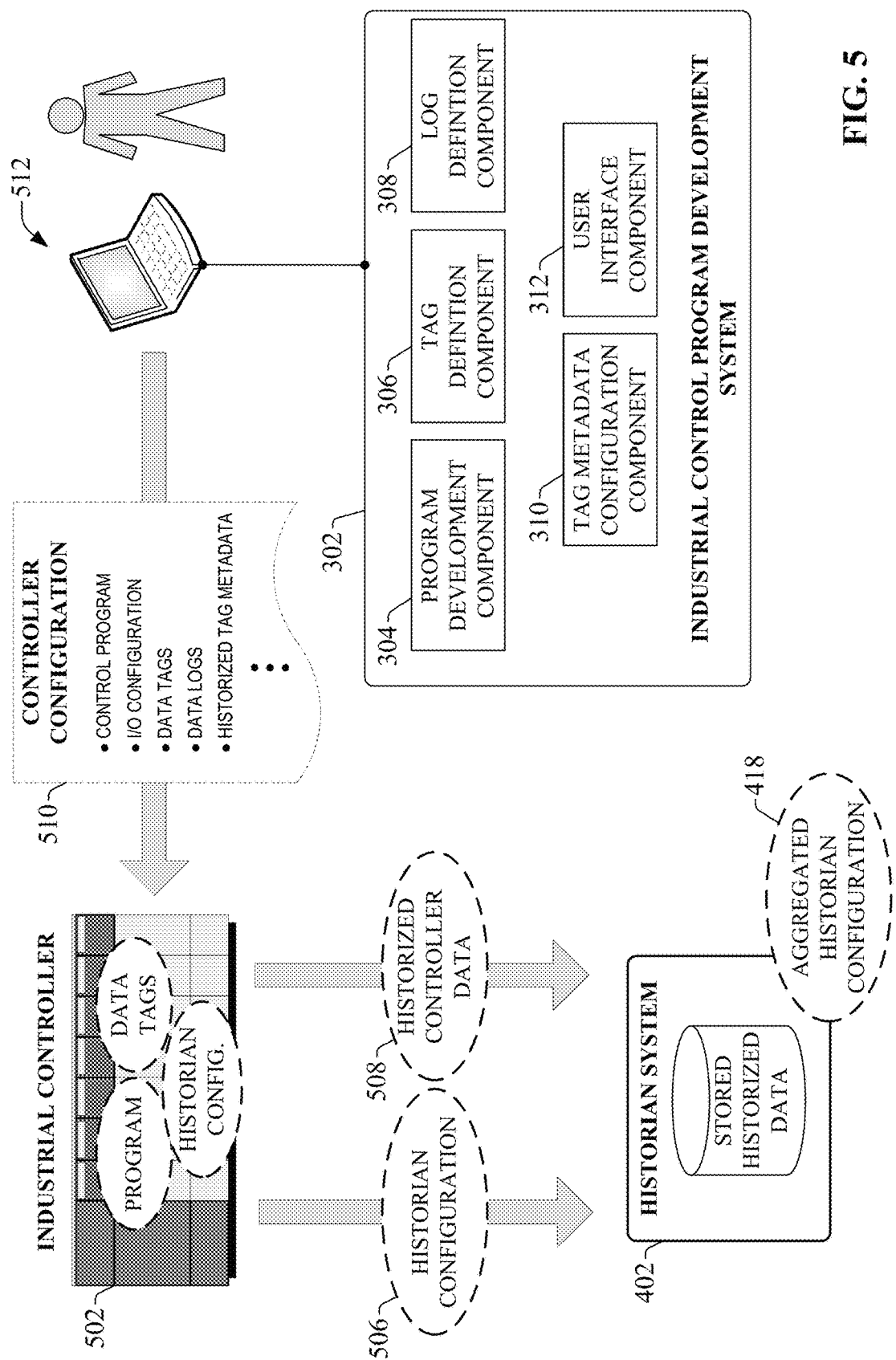
FIG. 5 is a diagram illustrating configuration of an industrial controller and a historian system.

FIG. 5 is a diagram illustrating configuration of an industrial controller 502 and a historian system 402 according to one or more embodiments of this disclosure. In this example, industrial control program development system 302 is installed and executed on client device 512, which may be a laptop computer, a desktop computer, a tablet computer, or any suitable hardware device capable of communicating with industrial controller 502 over a wired or wireless network connection. Through interaction with interface displays generated by user interface component 312, the user can develop an industrial control program and define associated data tags, in a manner similar to that described above in connection with FIG. 3. Program development component 304 and tag definition component 306 generate the controller configuration information based on the user's input.

Figure 6:
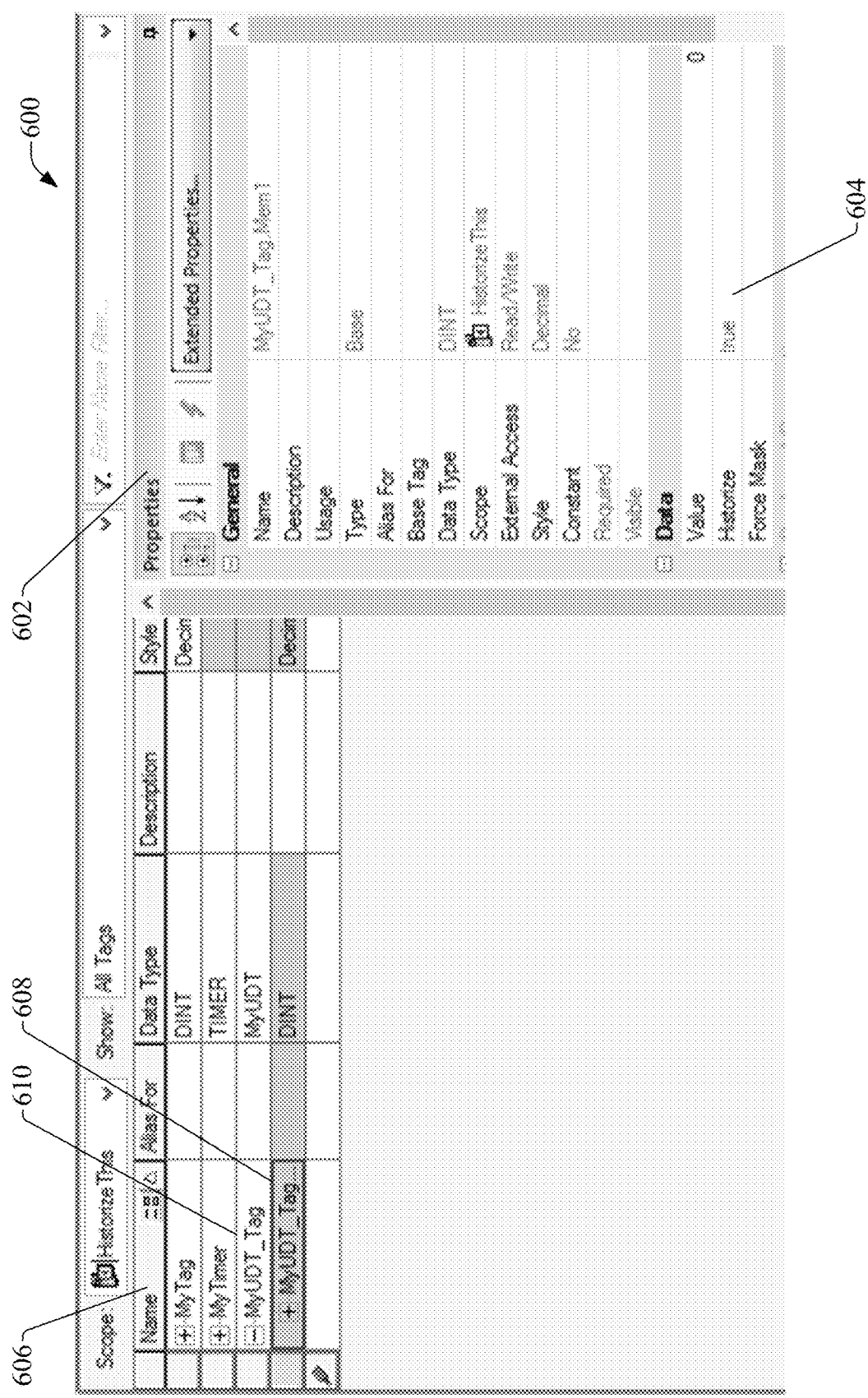
FIG. 6 is an example interface display for configuration of data tag attributes.

In contrast to the system described above in connection with FIG. 3, industrial control program development system 302 supports data tags (and, in some embodiments, controller-based logs) having historian-specific metadata attributes associated therewith. The tag metadata configuration component 310 also allows the user to set values for these controller-level metadata attributes for individual data tags that were previously defined by the tag definition component 306, or for data logs to be stored on the industrial controller. Turning briefly to FIG. 6, an example, non-limiting interface display 600 for configuration of data tag attributes is illustrated. Interface display 600 can be generated, for example, by user interface component 312. In an example implementation, this example display 600 may be invoked via the control program development interface of the development system 302. Example interface 600 includes a tag list section 606 on the left side of the display, which lists a set of tags defined for the industrial control program currently being developed. The defined tags are listed in the left-most Name column, with each row corresponding to a given data tag. The columns of the tag list section 606 represent respective properties of the data tags, including the data type, alias names, descriptions, or other such tag properties.

A properties window 602 is displayed on the right side of the interface display 600. Properties window 602 displays more detailed information for a data tag 608 selected in the tag list section 606 (named "MyUDT_Tag.Mem1"). In addition to general data tag properties listed in the General section, the Data section of the properties window 602 includes a writable Historize field 604. The system allows the user to set this Historize property to True if the selected data tag 608 is to be collected by data historian system 402 (see FIG. 5). The user may also reset this Historize property to False if the selected data tag 608 is to be exempted from data collection. This Historize property represents a metadata attribute to be associated with the selected data tag 608. When this historize attribute is subsequently red by the data historian system 402, the True value of the attribute will signal to data historian system 402 that the selected data tag 608 is to be collected for historical purposes.

In the example display 600 depicted in FIG. 6, the tags are organized in the tag list section 606 according to a hierarchical display structure that segregates data tags according to various categories of tags. For example, the hierarchical display structure displayed in the tag list section 606 includes three main tag categories—My Tag, My Timer, and My UDT_Tag—which can each be expanded to display the tags defined under each category. In addition to allowing the user to set (or reset) the Historize metadata attribute for individual tags by selecting the tag and setting the Historize attribute for the selected tag, one or more embodiments can allow the user to set the Historize metadata attribute for multiple tags under a common tag category by setting the Historize metadata attribute for the category node under which the tags reside. For example, if the user wishes to have the historian system collect data for all the tags under the MyUDT_Tag category node 610, the user can select the category node 610, which causes the properties window 602 to display category-level properties for the tag category (rather than the tag-level properties for an individually selected data tag). The category-level properties can include a Historize metadata attribute that, when set, applies the category-level Historize attribute to all data tags categorized under the category node 610. In this way, the system allows the user to set (or reset) the Historize metadata attribute for multiple tags using a single action. In the same manner, the system can also allow the user to set other related data collection attributes for the entire category of tags, including but not limited to a data collection rate, a storage location (e.g., a particular storage folder or memory device associated with the historian), a value range for data filtering, etc.

In yet another example, some embodiments of the control program development system 302 may allow the user to create tag groups, whereby the user may select tags from one or more different tag categories to be included in a user-defined tag group. Once a tag group is created in this fashion, the user may set common attributes for all tags within the group using a single action by setting a group-level Historize attribute and any associated data collection preferences (e.g., data collection rate, storage destination, etc.).

Although the present example depicts the Historize metadata property as being set via interface display 600, it is to be appreciated that embodiments of the present disclosure are not limited to the particular interface illustrated in FIG. 6. Rather, any suitable interface that allows a user to assign a metadata attribute value to a data tag of an industrial controller is within the scope of one or more embodiments described herein.

Moreover, although the examples presented herein describe operations of the industrial control program development system and the industrial data historian system in terms of data tag collection, it is to be appreciated that some embodiments may also allow the user to configure data logs (in addition to data tags) for collection by the historian. For example, using the control program development system 302, a user may define a data log (e.g., an alarm, diagnostic, or status log) to be maintained by the industrial controller 502. Alternatively, the industrial controller 502 may be pre-configured to maintain one or more data logs on its local memory for diagnostic or informational purposes. The control program development system 302 can allow the user to set metadata attributes for these logs in a similar manner to that described above for historization of data tags.

Returning now to FIG. 5, once the control program has been developed, the data tags and associated metadata attributes have been defined, and other necessary controller properties (e.g., I/O module configurations) have been configured, the user can download this controller configuration information 510 to the industrial controller 502 via a networked connection between the client device 512 and the controller 502 (or over a direct cable connection). Downloading the controller configuration information 510 to the industrial controller 502 configures the controller to execute the control program, allocates controller memory addresses to the respective defined data tags for storage and updating of data items maintained by the controller 502, and configures the controller to record data log information defined by the data log definitions. Also, by virtue of the historian metadata attributes, the controller configuration information 510 also provides the controller 502 with historian configuration information, which travels with the controller and can be read separately by historian system 402 to facilitate configuration of the data collection strategy defined by the metadata. The development system 302 can also allow the user to save the controller configuration information 510 as an offline file on the client device's local storage for backup or reference purposes.

While the configured industrial controller 502 and historian system 402 are on a shared network (e.g., a plant and/or office network on which the controller 502 and historian system 402 reside), the historian system 402 can initiate a discovery mode during which the network interface component 406 of historian system 402 scans its network for resident devices containing data tags (or data logs) having metadata attributes indicating that those data tags are to be historized. This discovery mode may be initiated manually by a user, or may be initiated automatically by the historian system 402 (e.g., in accordance with a periodic discovery routine, in response to a detecting installation of a new device on the network, etc.). When the configured industrial controller 502 is discovered by historian system 402 over the network, the metadata identification component 408 of historian system 402 scans the data tag configuration information from the controller 502, including the metadata attributes associated with each data tag. In response to discovering a data tag having a metadata attribute indicating that the data tag is to be historized, the metadata identification component 408 of historian system 402 updates its aggregated historian configuration data 418 to add the data tag to the set of data tags to be historized (that is, the set of data tags to be monitored and collected by the data collection component 404). In this way, the historian system 402 retrieves the controller-level historian configuration information 506 from the controller 502 itself, adds this controller-level historian configuration information to the historian system's aggregated historian configuration, and begins collecting controller data 508 associated with the identified historized controller data tags in accordance with the retrieved historian configuration.

In the case of data logs, when the historian system 402 discovers a data log on an industrial controller having an associated historize metadata attribute set, the historian system 402 will configure itself to collect and store data records associated with the data log. In such scenarios, when the controller adds a new data record to the log, the historian system 402 will receive a notification from the controller indicating that the new record has been added (or detect the addition based on a monitoring of the controller), and in response to the notification, retrieve and store a copy of the data record in historian memory.

In some embodiments, rather than being dependent on a discovery mode to be initiated at the historian system, the industrial controller itself may send a notification signal to the network when a metadata attribute associated with one of its data tags has been changed. The notification signal may include, for example, an identification of the controller as well as the data tag that has been modified. Upon receipt of the notification, the historian system can retrieve the metadata attribute for the affected tag and update its configuration information accordingly.

Using the techniques described above, the control program development system 302 allows a program developer—during development of the controller program—to select the data tags that are to be historized, and to save this historian configuration on the controller itself as tag metadata. Since the historian system 402 will automatically configure its data collection strategy based on a reading of this controller-level metadata, the system mitigates the need for a user to separately configure the historian system to monitor and collect the selected tags (e.g., by browsing the set of available controller tags from the historian and selecting the tags to be historized, as in some conventional methods). Instead, the data required to configure the historian system 402 is maintained on the industrial controller 502 itself and made available to the historian system 402. For large plant systems that include multiple industrial controllers having data to be collected on a common historian system, the architecture described herein essentially distributes the task of updating the historian configuration among the program developers responsible for the respective controllers (e.g., the engineers assigned to different work areas of the plant), rather than relying upon a single historian administrator to configure the historian system to collect the desired data items from all controllers within a plant, a process which may otherwise involve coordination between the plant-floor engineers and the historian administrator.

Figure 7:
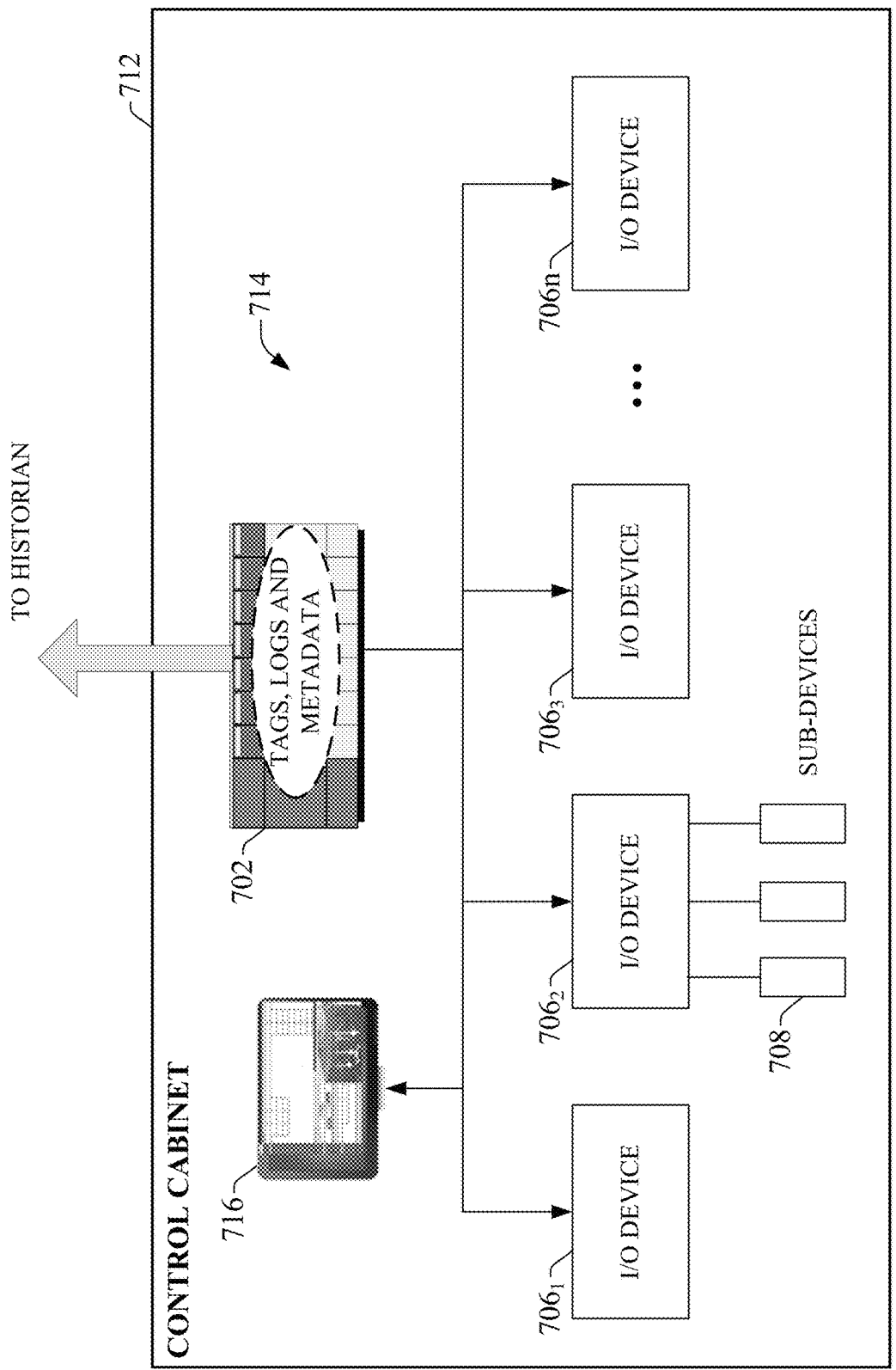
FIG. 7 is a diagram of an example control system that includes an industrial controller having preconfigured historian metadata.

The techniques described herein can also simplify the process of deploying a new machine in a plant environment, such as a machine and associated control cabinet provided by an original equipment manufacturer (OEM). In particular, the historian configuration techniques described herein allow a newly installed control system to be quickly and easily integrated into a customer's existing historian system responsible for collected data throughout the plant environment. FIG. 7 is a diagram of an example control system 714 that includes an industrial controller 702 having preconfigured historian metadata. In this example, an industrial controller 702 is mounted in a control cabinet 712 as part of a control system 714 to be installed at a plant facility. The control system 714 is housed in control cabinet 712, which may have been designed and built by an OEM, a systems integrator, or other machine builder to fulfill a customer order.

Control system 714 may comprise a number of I/O devices 706 (e.g., motor drives, sensors or other telemetry devices, solenoid valves, remote I/O modules, etc.) interfaced with the industrial controller 702. The I/O devices 706 may be hardwired to the industrial controller's I/O modules, or may exchange data with the industrial controller 702 over a local network (e.g., EthernetIP, common industrial protocol, etc.). In addition, one or more of the I/O devices 706 may have a number of sub-devices 708 connected thereto.

For example, if an I/O device is a remote I/O module, sub-devices 708 may comprise the I/O devices connected to that remote I/O module. The control cabinet 712 may also include an HMI terminal 716 for visualizing the machine or process being controlled by the control system 714. The HMI terminal 716 is communicatively connected to the industrial controller 702 over a local network connection or an interface cable.

During fabrication of the control system 714, the OEM or systems integrator create and download a control program the industrial controller 702 for control of the I/O devices 706 or other I/O points of the associated machine. During program development, the program developer will typically create the necessary data tags required for the program. In addition, and in accordance with one or more embodiments described herein, the programmer will set the historian metadata attribute for any data tags that are to be collected by the end customer's plant historian. The programmer may base the selection of which data tags will be historized based on the customer's specifications, or based on the machine designer's understanding of important performance indicators that should be monitored and archived. Thus, when the control cabinet 712 is delivered to the customer facility, the controller contains the controller program and associated data tags, as well as the historian metadata required to integrate the new control system 714 into the customer's plant historian.

Figure 8:
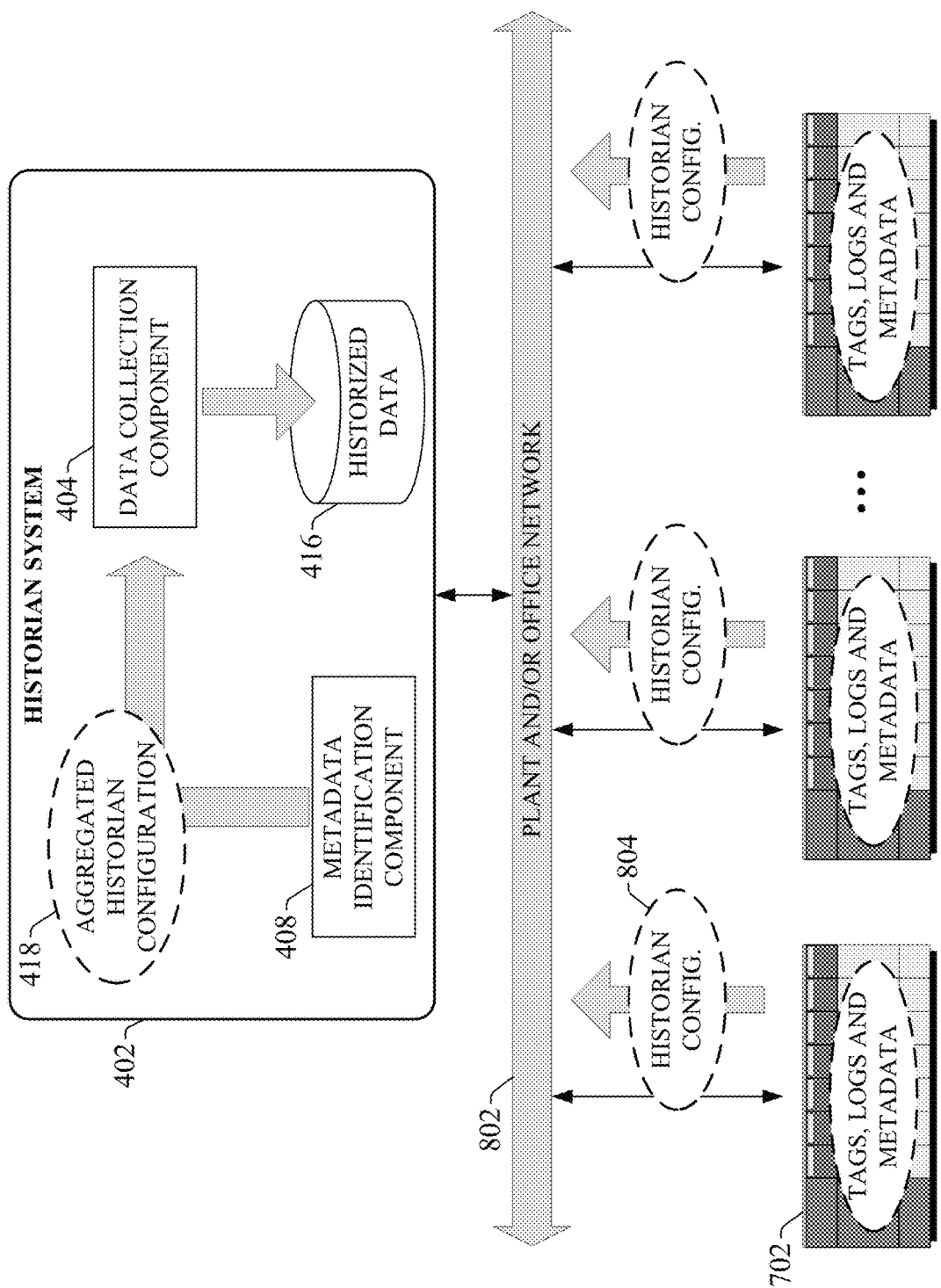
FIG. 8 is a diagram illustrating configuration of a historian system based on historian configuration information retrieved from multiple distributed industrial controllers.

As shown in FIG. 8, when control cabinet 712 is deployed at the customer facility and the controller 702 is installed on the customer's plant network, the customer's plant historian system will access the controller's memory, retrieve the historian configuration information 804 defined by the metadata for the respective data tags defined in the controller, and update its aggregated historian configuration 418 to add the data tags identified as historized tags to the global set of tags to be monitored and historized by the historian system 402. Once the aggregated historian configuration 418 is updated, the data collection component 404 will begin collecting and storing data from the identified data tags together with the other historized tags from other controllers throughout the plant.

As illustrated in FIG. 8, the metadata identification component 408 of the historian system 418 can maintain an accurate aggregated historian configuration 418 for collection of data from multiple controllers deployed throughout the plant by reading the historian metadata from the respective controllers. In this way, management of the historian system configuration is carried out automatically by the historian system 402 based on metadata set by the programmers of the respective industrial controllers. This architecture facilitates automatic updating of the historian system's aggregated historian configuration 418 in response to detection of changes to the tag-level metadata attributes within the industrial controllers. For example, in the event that a plant engineer responsible for a production area in which controller 702 is deployed adds new programming to the controller to add a new operating sequence, or modifies existing programming to alter machine operation, the engineer may determine that new data items associated with the new programming must be collected by the historian system 402, or that previously collected data items need no longer be collected. Accordingly, the engineer may set (or reset) the appropriate historize metadata attributes for the selected data tags. Meanwhile, the metadata identification component 408 can detect these modifications based on a scan of the tag metadata across the network 802. In this regard, some embodiments of the metadata identification component 408 may be configured to scan the data tag metadata on the various controllers periodically in order to determine whether the historize metadata attributes have changed, or if new data tags that are to be historized have been added to any of the controllers. Upon detection of the modified metadata attributes, the metadata identification component 418 will update the aggregated historian configuration 418 to reflect the modifications, causing the data collection component 404 to alter its data collection strategy accordingly (e.g., to begin collecting the newly added historized data tags, to cease collection of a data tag whose metadata attribute was set to FALSE, etc.).

Figure 9:
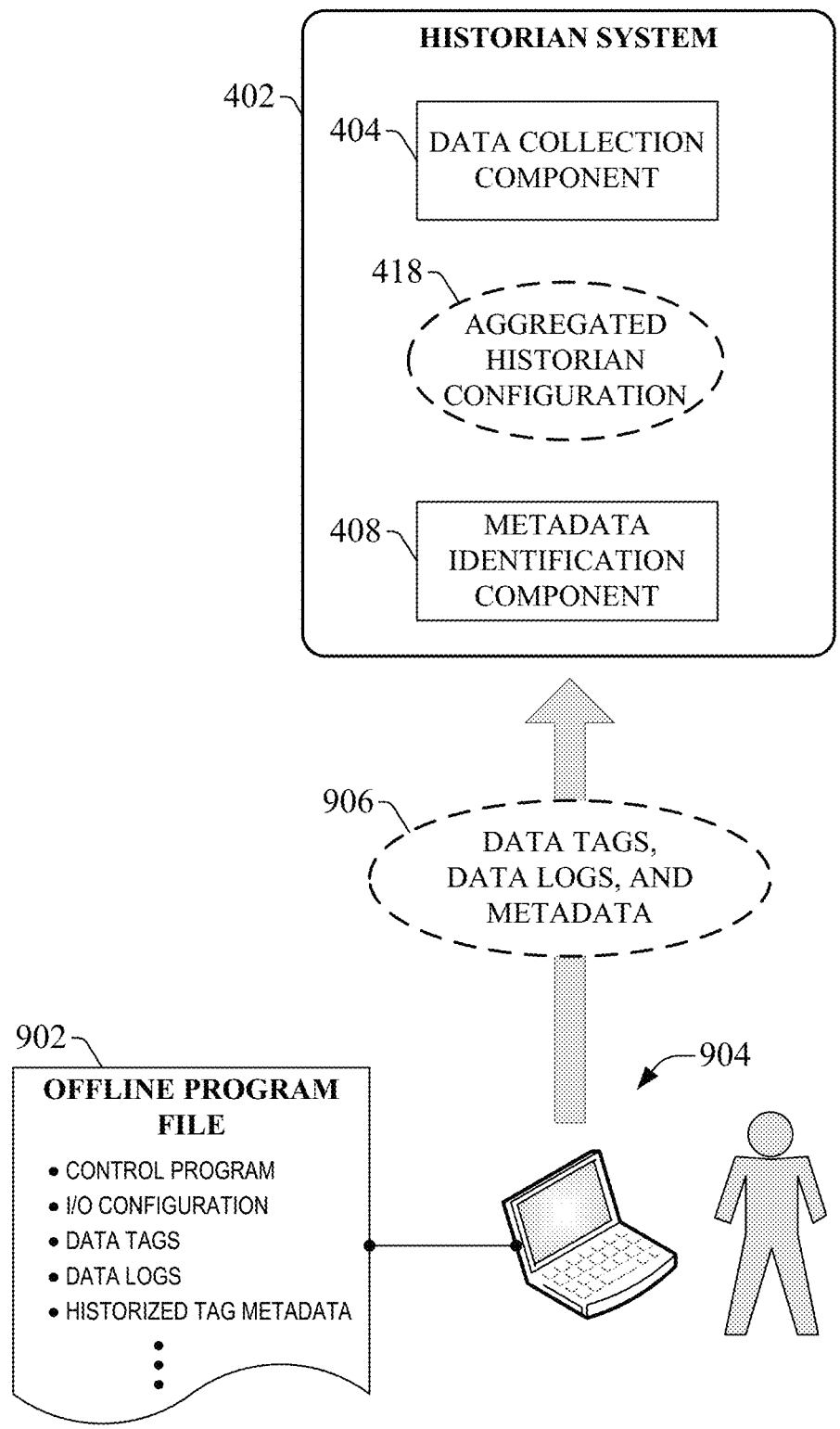
FIG. 9 is a diagram illustrating configuration of a historian system's aggregated historian configuration based on information read from an offline program file.

As noted above, the development system 302 can save the controller configuration information 510 developed by the user as an offline control program file, which can be stored offline relative to the controller. In one or more embodiments, in addition to updating its aggregated historian configuration information 418 based on metadata attributes read from the controllers themselves, the metadata identification component 408 can also read metadata attributes from these offline program files. FIG. 9 is a diagram illustrating configuration of the historian system's aggregated historian configuration 418 based on information read from an offline program file 902. In this example, the offline program file 902 is stored on the user's client device 904. The offline program file 902 stores the control program, I/O configuration, data tag, data log, and metadata information associated with the data tags and data logs in a file format compatible with the development system 302, such that opening the file using the development system's interface renders the control program and associated configuration information within the development system's development environment.

To facilitate configuration of the historian system, the user can network the client device 904 with the historian system 402 over a wired or wireless network connection, or via a direct cable connection (e.g., universal serial bus, serial, etc.). The metadata identification component 408 can then read the data tag, data log definition, and metadata information 906 from the offline program file 902 and update the aggregated historian configuration information 418 for collection of any tags identified as being historized by the metadata attributes, similar to the manner in which the same information is read from the industrial controllers themselves. Configuring historian system 402 using offline files rather may be useful in scenarios in which a user wishes to configure the historian system 402 before the historian system is networked with the controller (e.g., before the controller is deployed on the plant network).

Figure 10:
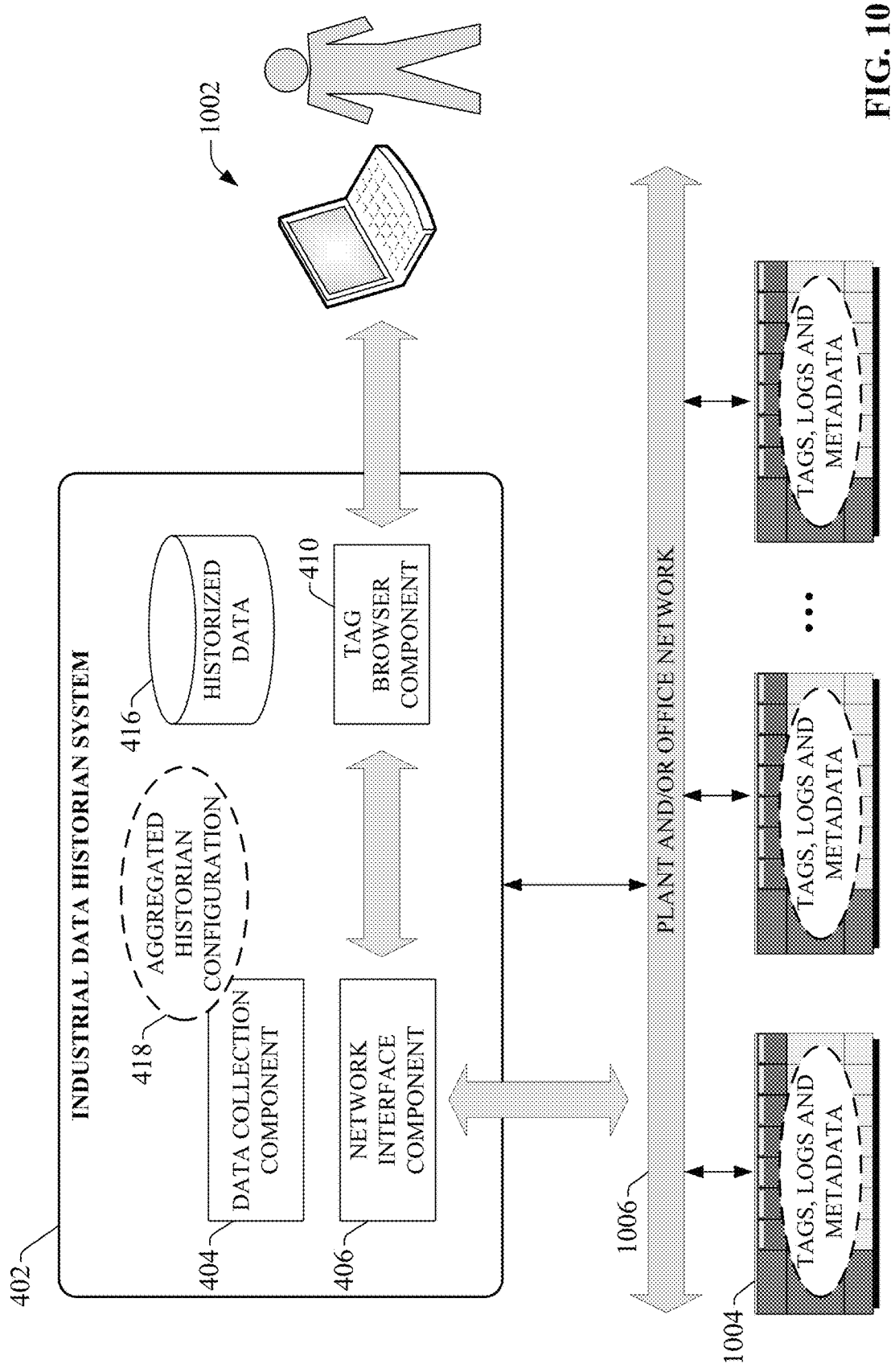
FIG. 10 is a diagram illustrating browsing of available data tags via a historian system.

Once the historian system 402 had begun collecting data from the distributed industrial controllers, a user can interact with the historian system 402 to browse and view the historized data 416 stored on the historian's memory. In addition to allowing the user to browse the collected and archived data, the historian system also includes a tag browser component 410 that allows the user to browse the available data tags on the distributed industrial controllers from the historian system. FIG. 10 is a diagram illustrating browsing of available data tags via the historian system 402. In one or more embodiments, the user can interface with historian system 402 via a client device 1002 (e.g., a laptop computer, desktop computer, tablet computer, etc.) over a wired or wireless network connection to access one or more user interface displays generated by tag browser component 410. The tag browser component 410 interacts with network interface component 406, which scans the network 1006 to locate the industrial controllers 1004 being monitored by the historian system 402 as well as the available data tags defined on each controller. The network interface component 406 can retrieve from the controllers relevant information about each tag for presentation to the user, including but not limited to an identity of the controller on which the tag is located, the name of the tag, the data type of the tag, a current data value or status of the tag, or other such information. The network interface component 406 can also retrieve at least a subset of the metadata associated with each tag, including an indication of whether the tag is set to be historized. Once this information is retrieved, the tag browser component 410 can generate and display on client device 1002 a graphical interface that allows the user to browse and view this available tag information.

Figure 11:
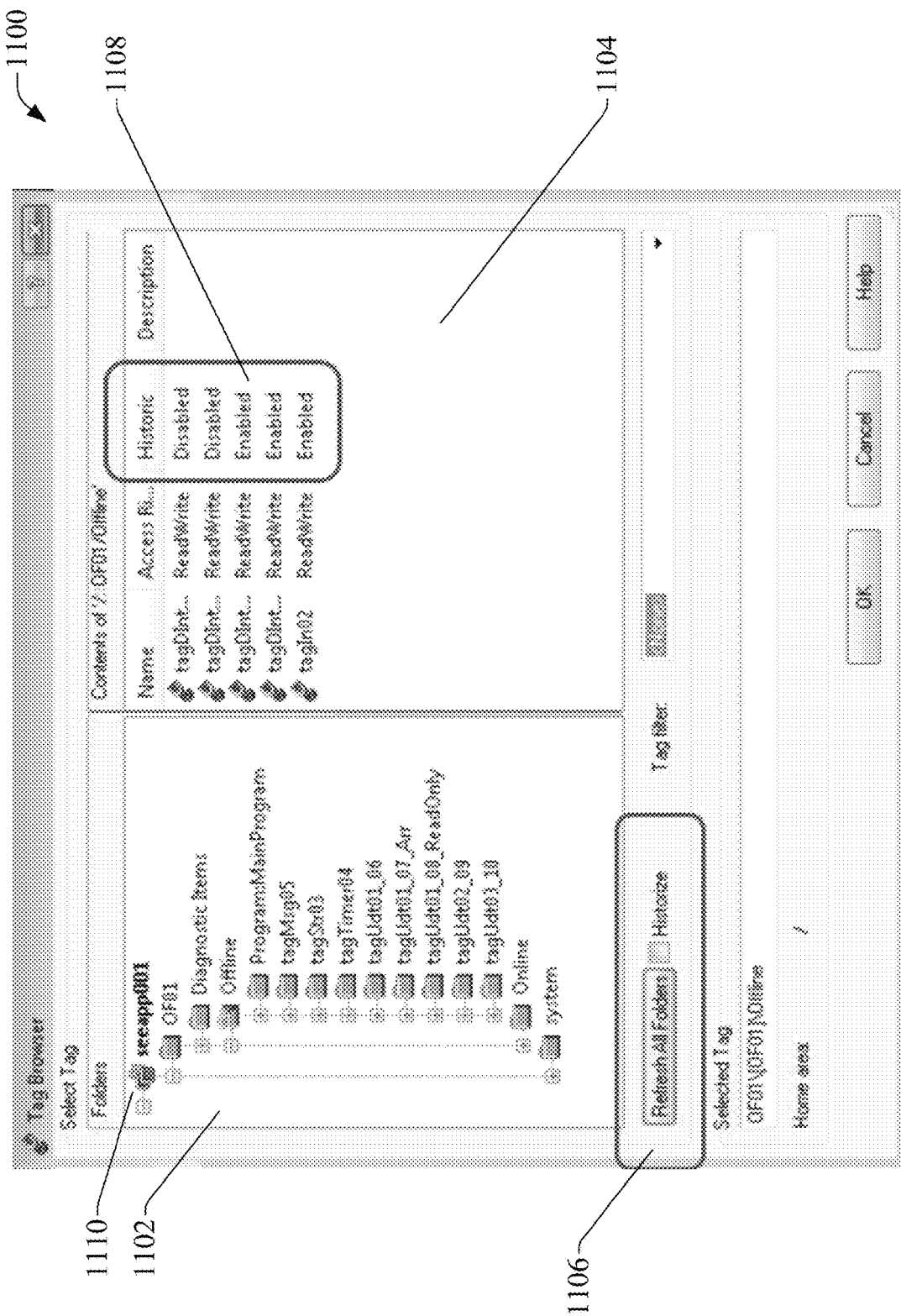
FIG. 11 is a screenshot of an example tag browser display.

FIG. 11 is a screenshot of an example tag browser display 1100 that can be generated by the tag browser component 410. This example display 1100 comprises a Folder window 1102 on the left side of the display, which renders a hierarchical view of the memory locations for the available tags. The hierarchical tree in the Folder window 1102 can include nodes 1110 corresponding to the different controllers on the network, which can each be expanded to display sub-nodes representing different categories of data tags defined on the selected controller (e.g., System tags, Diagnostic tags, Offline tags, Online tags, etc.). Selecting a sub-node corresponding to a category of tag on a controller causes the set of tags corresponding to that category to be displayed in a Tag window 1104 on the right side of display 1100.

The tag window 1104 renders the tags in a list format, where each row corresponds to a data tag and each column represents an attribute of the tag. In the example depicted in FIG. 11, the displayed attributes include the tag name, the access rights for the tag, an indication of whether the tag is set to be historized (based on the metadata attribute) and a description of the tag. The Historic column 1108 indicates whether historization of each tag is enabled or disabled based on the value of the historize metadata attributes read from the controllers. The system also allows filtering of the tags based on this historize metadata attribute. For example, the display 1100 may include a "Historize" filter selection 1106 that, when selected, causes the Tag window 1104 to display only the subset of available tags whose historize metadata attribute is set to Enabled.

Figure 12:
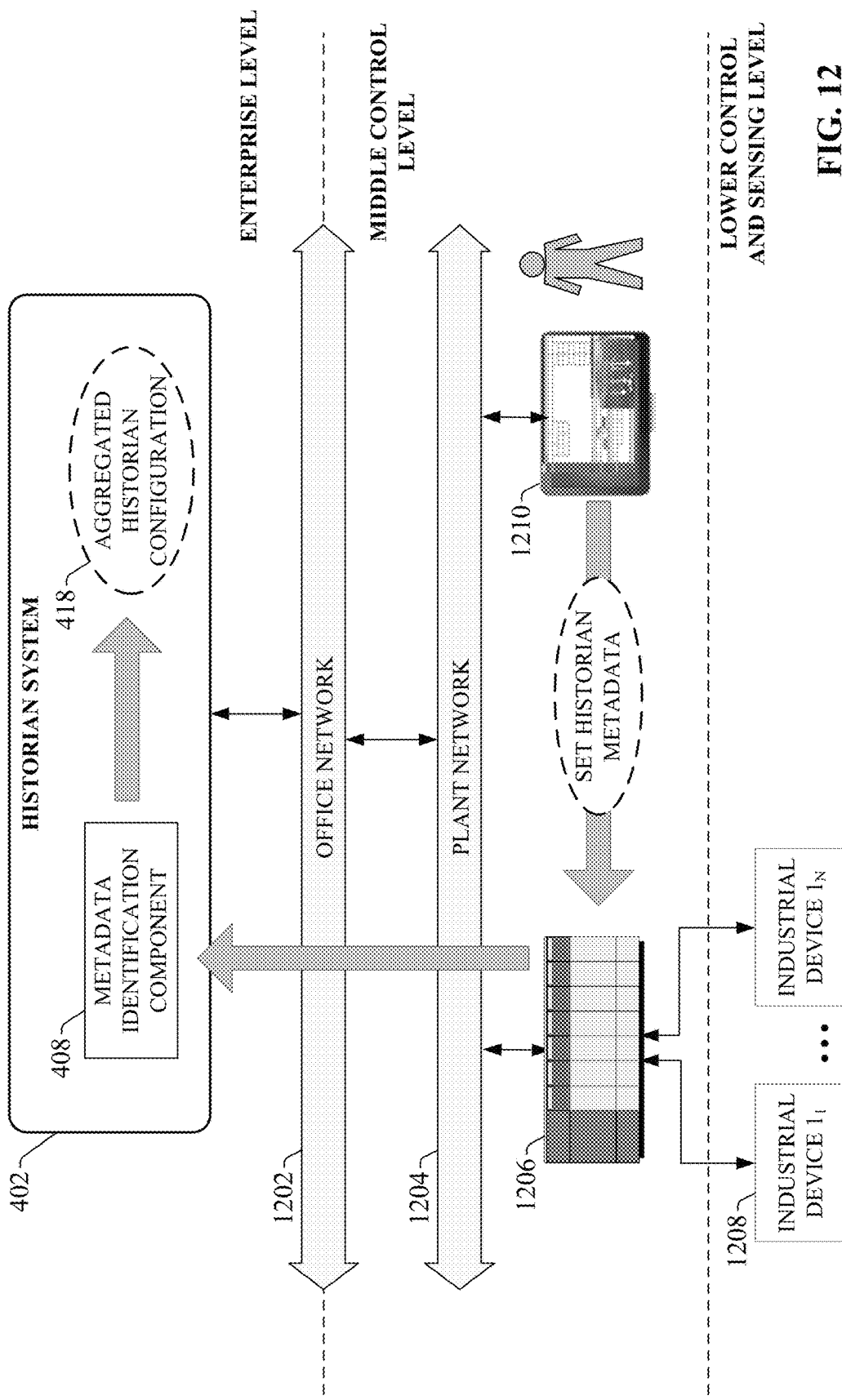
FIG. 12 is a diagram illustrating enablement of data collection for a data tag via an HMI command.

Since the determination of whether a controller data tag will be collected by the historian system is based on the tag metadata stored on the industrial controllers themselves, historization of a data tag can be easily enabled from the plant floor after the controller has been deployed and is in operation. For example, a plant engineer can interface with an industrial controller in the field using development system 302, locate a controller tag that is to be added to the historian data collection, and set the metadata attribute that facilitates data collection. Alternatively, the metadata attribute can be set (or reset) via an HMI. FIG. 12 is a diagram illustrating enablement of data collection for a data tag via an HMI command In this example, an industrial controller 1206 resides on plant network 1204 and executes a control program to facilitate monitoring and control of one or more industrial devices 1208 (e.g., telemetry devices, user interface devices, safety monitoring devices, motor drives, pneumatic actuators, signaling devices, robot control inputs, valves, etc.). In addition, an HMI terminal device 1210 installed on the plant network 1204 is configured to exchange data with the controller 1206 over the network (or over a direct cable connection between the HMI terminal device 1210 and controller 1206). HMI terminal device reads data from selected data tags on controller 1206 and renders the tag data on one or more graphic display screens, either in a text format or as a graphical animation. The HMI terminal device 1210 can also push data values entered by a user to specified data tags in controller 1206, thereby allowing the user to control aspects of the controlled industrial process by changing parameter setpoint values, initiate predefined sequences, etc.

The HMI terminal device 1210 executes an HMI application that defines the graphical interface displays to be rendered by the terminal device 1210, the navigation structure between these displays, and the data links to specific data tags in the industrial controller for the purposes of reading and writing data. In addition, the HMI application may define links to the historize metadata attributes of selected data tags, thereby allowing a user at the HMI terminal device 1210 to set or reset the metadata attributes of selected data tags via interaction with the HMI interface displays. In an example implementation, the HMI application developer may create an interface display that lists available data tags within the industrial controller 1206, and associate a graphical toggle button with each data tag, where each button is linked to the historize metadata attribute for the given data tag. By interacting with a graphical button associated with a given data tag (that is, a graphical button linked to the data tag's historize metadata attribute), the user can enable or disable historical data collection for that tag. The metadata identification component 408 of historian system 402 (residing on an office network 1202 connected to the plant network 1204 in the illustrated example) will detect the change to the metadata attribute value and update the aggregated historian configuration accordingly, to either add the data tag to the data collection set or to exempt the tag from data collection. As in previous examples, this technique does not require a user to interface directly with historian system 402 to add the data tag to the data collection routine (or to remove the tag from the data collection routine).

Figure 13:
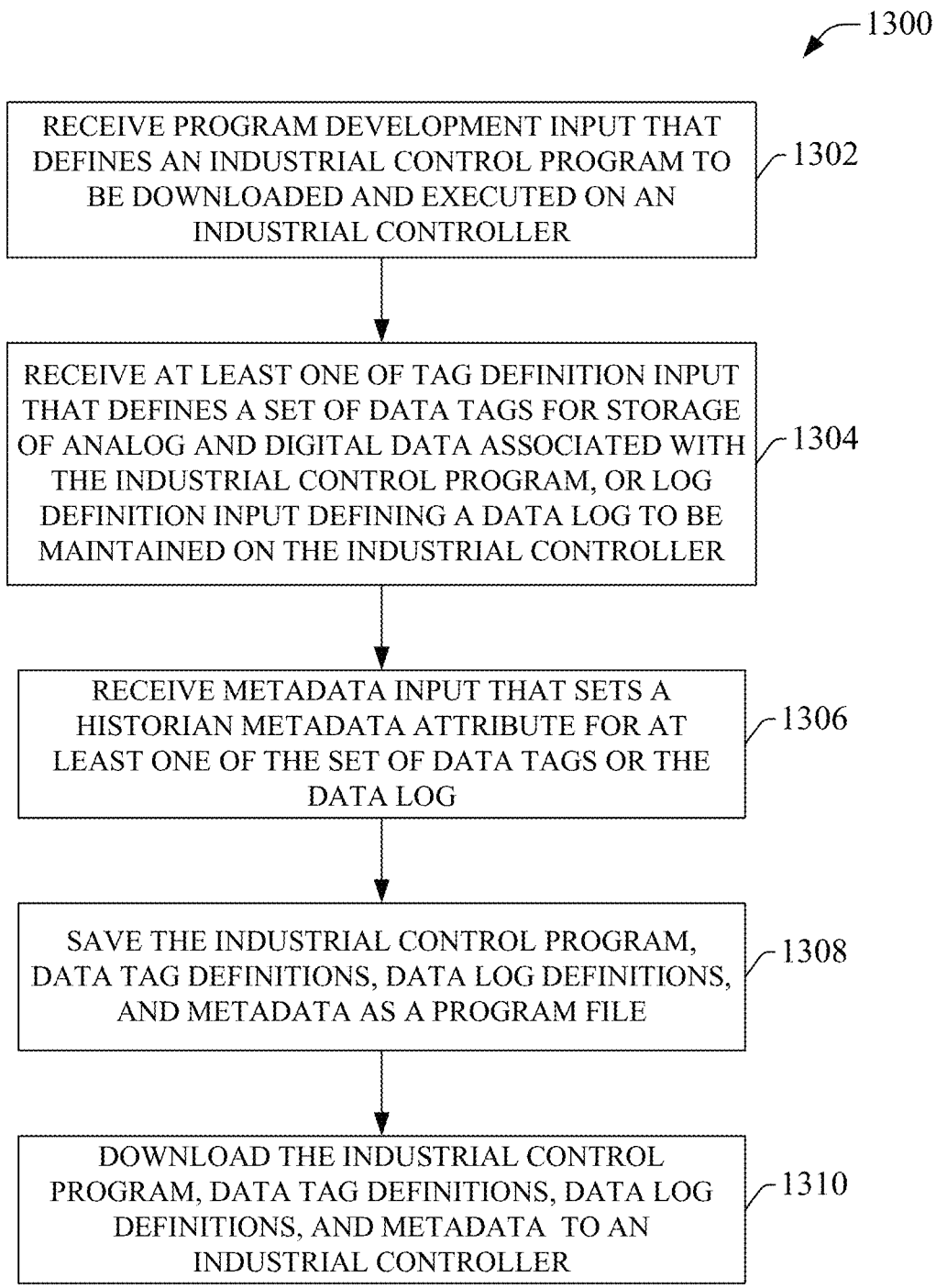
FIG. 13 is a flowchart of an example methodology for developing an industrial control program and configuring one or more data tags associated therewith for collection by a separate data historian system.
Figure 14:
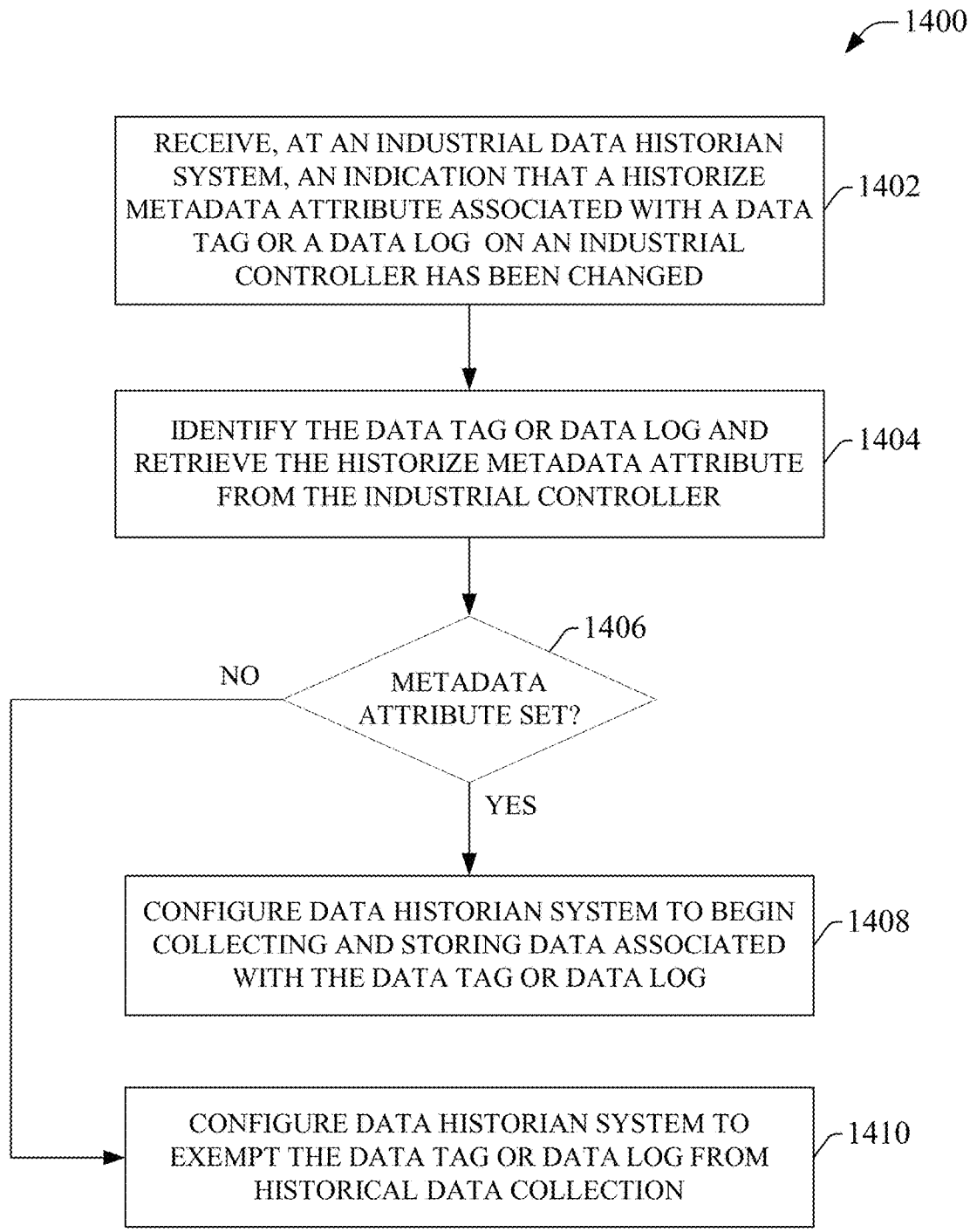
FIG. 14 is a flowchart of an example methodology for automatic configuration of an industrial data historian based on metadata read from an industrial controller.
Figure 15:
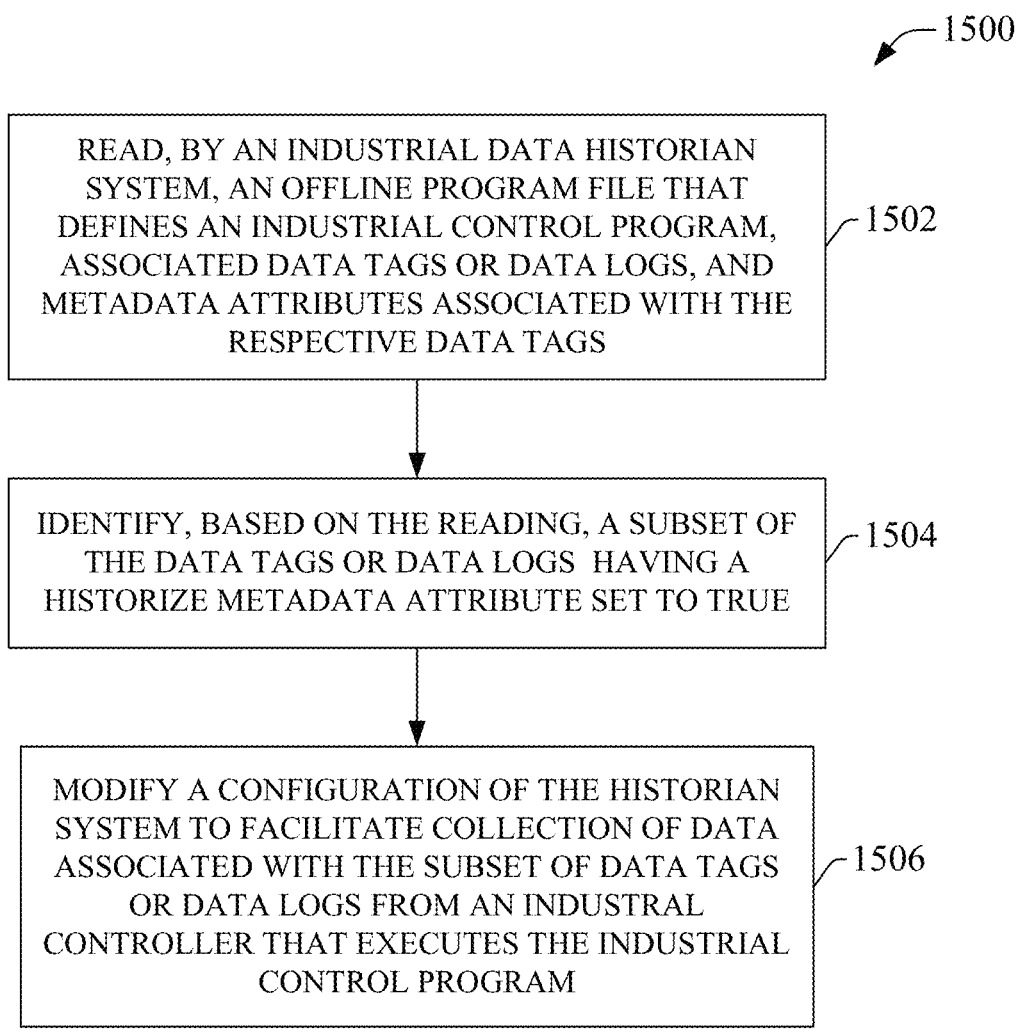
FIG. 15 is a flowchart of an example methodology for automated configuration of an industrial data historian based on information read from an offline program file.

FIGS. 13-15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for developing an industrial control program and configuring one or more data tags associated therewith for collection by a separate data historian system. Initially, at 1302, program development input is received that defines an industrial control program to be downloaded and executed on an industrial controller. The program development input can be received, for example, by an industrial control program development system, such as a ladder logic or sequential function block development environment. At 1304, at least one of tag definition information or log definition information is received. The tag definition information defines a set of data tags associated with the industrial control program, where the data tags define memory aliases for storage of analog and digital data associated with the industrial control program. Some of the data tags may correspond to I/O points of the industrial controller on which the program will be executed (e.g., digital or analog inputs and outputs associated with the controller's various I/O modules), while other data tags may represent calculated values generated by the industrial control program relating to the industrial machine or process that will be controlled by the program (e.g., motor speeds, product counts, temperature values, pressure values, flow values, etc.). The log definition information defines one or more data logs to be maintained on the industrial controller. Such data logs can be configured to store records of specified types of events on the controller's local memory (e.g., alarms, controller diagnostic events, process control events, etc.).

At 1306 metadata input is received that sets a historian metadata attribute for at least one of the set of data tags or data logs defined at step 1304. In an example scenario, the program development environment may allow the user to select a defined tag and set an associated historize metadata attribute to TRUE, thereby flagging the selected data tag or data log for historical data collection. In some embodiments, the development system may also allow other historian-related metadata attributes to be set for the data item (the data tag or data log), including but not limited to a collection rate defining the frequency with which the data item's value is sampled and saved by a data historian, a memory location to which the data will be stored, a value range defining the range of allowable values of the data item that will be stored in historian memory, etc.

At 1308, the industrial control program, data tag definitions, data log definitions, and metadata defined in steps 1302-1306 is saved as a program file. At 1310, the industrial control program is downloaded to an industrial controller. With the data tags, data log definitions, and associated metadata defining the desired data collection strategy installed on the controller, a separate industrial data historian system can read the metadata from the controller in order to determine how the historian should be configured to collect the desired data items from the controller.

FIG. 14 illustrates an example methodology 1400 for automatic configuration of an industrial data historian based on metadata read from an industrial controller. Initially, at 1402, an industrial data historian system receives an indication that a historize metadata attribute associated with a data item—e.g., a data tag or a data log—on an industrial controller has been changed. For example, the data historian may receive a notification proactively generated by the controller indicating that one or more of its data tags or data logs have had their historize metadata attributes modified. In another example, the data historian may periodically poll the network to which it is connected to identify changes to the metadata defined on the controllers on the network. In yet another example, the data historian may detect the presence of a new controller on its network, and initiate methodology 1400 in response to discovery of the controller in order to determine which of the controller's data tags or data logs should be collected for historical purposes.

At 1404, the data tag or data log having the modified metadata attribute is identified and retrieved from the controller by the data historian (e.g., via the shared network). At 1406, a determination is made regarding whether the metadata attribute is set (e.g., the historize attribute is set to TRUE). If the attribute is set (YES at 1406), the methodology moves to step 1408, where the data historian system configures itself to begin collecting and storing data associated with the data tag or data log. Alternatively, if the metadata attribute is not set (NO at 1406), the methodology moves to step 1410, where the data historian system configures itself to exempt the data tag or data log from historical data collection.

FIG. 15 illustrates an example methodology 1500 for automated configuration of an industrial data historian based on information read from an offline program file. Initially, at 1502, an offline program file that defines an industrial control program, associated data tags or data logs, and metadata attributes associated with the respective data tags or data logs is read by an industrial data historian system. The offline program file may be stored on a client device on which the program file was developed, or on another storage device. The offline program file contains information that, when downloaded to and executed by an industrial controller by a program development system, facilitates monitoring and control of an industrial machine or process.

At 1504, a subset of the data tags or data logs contained in the offline program file having a historize metadata attribute set to true are identified by the historian system based on the reading of the program file. The historian system may also read additional historian-related metadata associated with each of the subset of data tags or data logs, such as a data collection rate, maximum and minimum values to be stored by the historian, etc. At 1506, based on the information identified at step 1504, the historian system modifies its configuration to facilitate collection of data associated with the subset of data tags or data logs from an industrial controller that executes the industrial control program.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
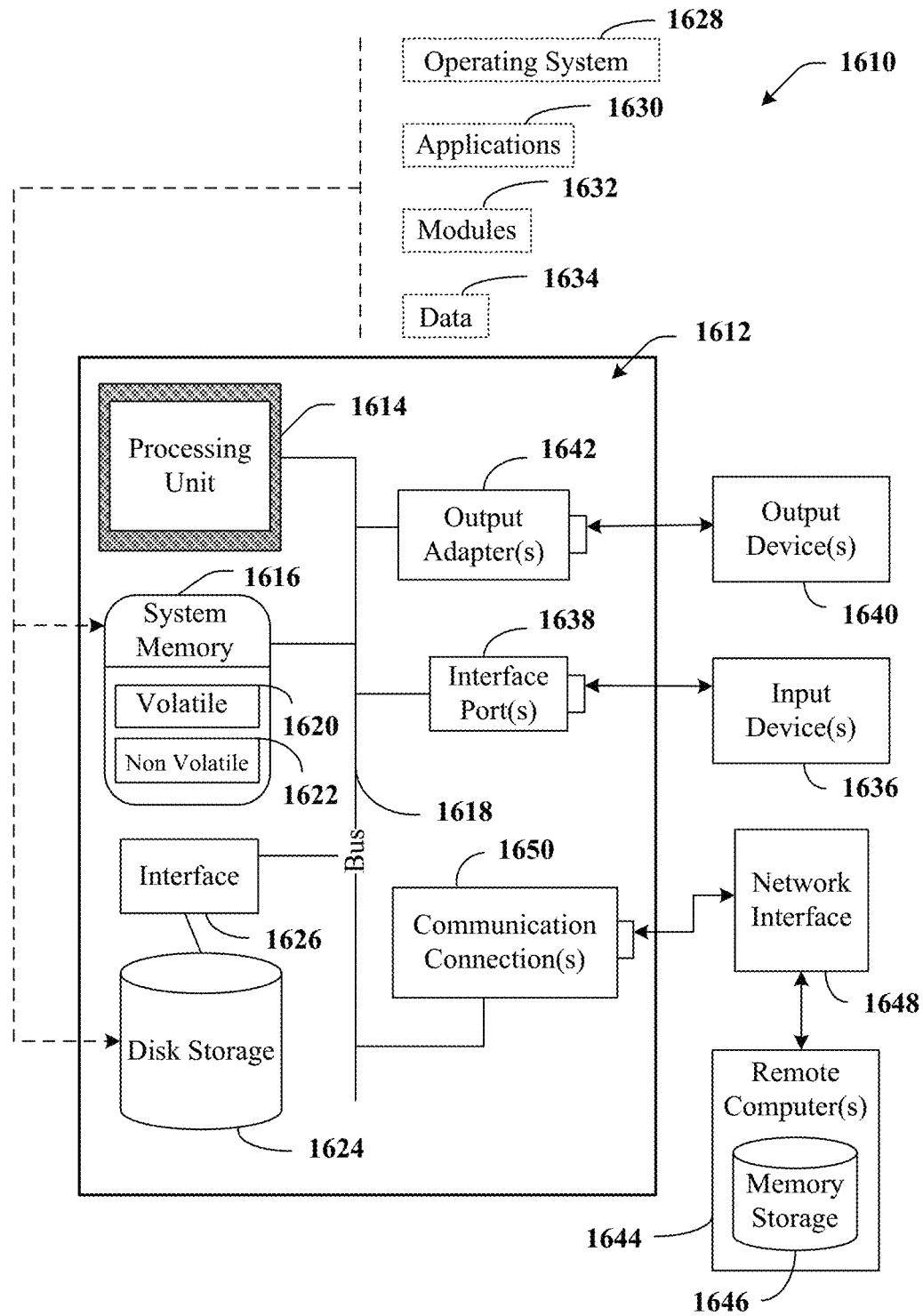
FIG. 16 is an example computing environment.
Figure 17:
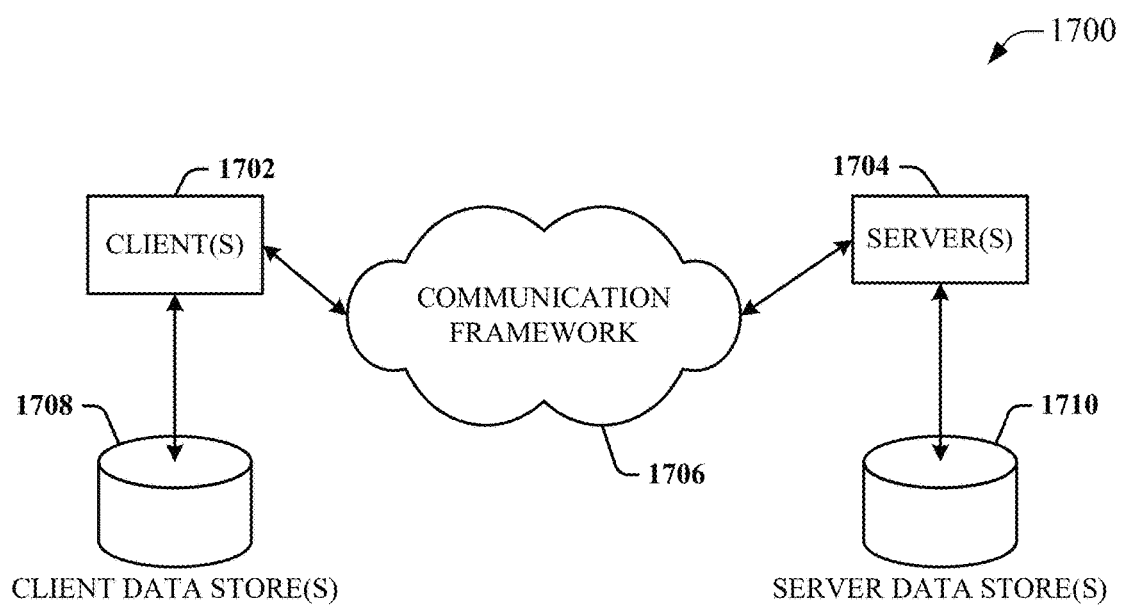
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 2334 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1648 can also encompass near field communication (NFC) or Bluetooth communication.

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 2408 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for collecting and storing industrial data, comprising:
    a memory that stores executable components;
    a hardware processor, operatively coupled to the memory, that executes the executable components, the executable components comprising:
        a network interface component configured to establish data communication with one or more industrial controllers via a network connection;
        a data collection component configured to read, from the one or more industrial controllers via the network connection, data values associated with data items defined on the industrial controllers and store the data values in the memory, wherein the data items comprise at least one of data tags or data logs; and
        a metadata identification component configured to
            read, via the network connection, data item information from an industrial controller of the one or more industrial controllers, wherein the data item information identifies a set of data items defined on the industrial controller,
            read, from the industrial controller via the network connection, historize metadata attributes respectively associated with the set of data items,
            identify a subset of the data items having respective first historize metadata attributes that are set to a value indicating that data collection is enabled, wherein the subset of the data items further have respective second historize metadata attributes defining respective data collection rates for the subset of the data items; and
            configure, based on the first historize metadata attributes and the second historize metadata attributes, the data collection component to collect and store data from the subset of the data items in accordance with the respective data collection rates defined by the second historize metadata attributes.

2. The system of claim 1, wherein the metadata identification component is further configured to:
    read, from the industrial controller via the network connection, other metadata attributes respectively associated with the subset of the data items, and
    configure the data collection component to collect and store the data from the subset of data items based on values of the other metadata attributes, wherein the other metadata attributes comprise at least one of a data storage location, a maximum data value to be stored in the memory, or a minimum data value to be stored in the memory.

3. The system of claim 1, wherein the metadata identification component is further configured to
in response to detecting that one of the first historize metadata attributes associated with one of the subset of the data items has changed to a value indicating that data collection is disabled, reconfigure the data collection component to cease collection and storage of data associated with the one of the subset of the data items.

4. The system of claim 3, wherein the metadata identification component is configured to read the data item information and the historize metadata attributes periodically.

5. The system of claim 1, wherein
the metadata identification component is configured to read the data item information and the historize metadata attributes from a program file stored separately from the industrial controller, and
the program file defines a control program capable of execution on the industrial controller.

6. The system of claim 1, further comprising a tag browser component configured to display, on a graphical interface display, information relating to the data items defined on the industrial controllers.

7. The system of claim 6, wherein the information relating to the data items comprises, for each of the data items, at least a name of the data item, a description of the data item, a value of one of the first historize metadata attributes associated the data item, and a value of one of the second historize metadata attributes for the data item.

8. The system of claim 7, wherein the graphical interface display is configured to, in response to receipt of selection input received via interaction with a filter control, filter the information relating to the data items according to at least one of the value of the first historize metadata attribute or the value of the second historize metadata attribute.

9. The system of claim 1, wherein at least one of the historize metadata attributes is set via at least one of an industrial controller program development system or via a write command issued by a human-machine interface device.

10. A method for configuring an industrial data historian, comprising:
establishing, by a data historian system comprising at least one processor, data communication with one or more industrial controllers via a network connection;
obtaining, by the data historian system via the network connection, data item information from an industrial controller of the one or more industrial controllers, wherein the data item information identifies a set of data items defined on the industrial controller, and the set of data items comprise at least one of data tags or data logs;
obtaining, from the industrial controller by the data historian system via the network connection, metadata respectively associated with the set of data items;
determining, by the data historian system based on the metadata, a subset of the data items having associated first metadata attributes that are set to a value indicating that data collection is enabled;
reading, by the data historian system, values of second metadata attributes associated with the subset of the data items, wherein the values of the second metadata attributes define respective data collection rates for the subset of the data items; and
updating, by the data historian system based on the metadata, a configuration of the data historian system to cause the data historian system to collect and store data associated with the subset of the data items at the respective data collection rates indicated by the values of the second metadata attributes.

11. The method of claim 10, further comprising:
determining, by the data historian system, another metadata attribute associated with at least one data item of the subset of the data items, wherein the other metadata attribute comprises at least one of a data storage location for the at least one data item, a maximum data value of the at least one data item to be stored by the data historian system, or a minimum data value of the at least one data item to be stored by the data historian system; and
updating, by the data historian system, the configuration of the data historian system based on the other metadata attribute.

12. The method of claim 10, further comprising:
in response to detecting that a first metadata attribute, of the first metadata attributes, associated with one of the data items has changed:
updating, by the data collection system, the configuration of the data historian system to cause the data historian to begin collection and storage of data associated with the one of the data items in response to determining that the first metadata attribute comprises a first value indicating that data collection is enabled, and
updating, by the data collection system, the configuration of the data historian system to cause the data historian to cease collection and storage of data associated with the one of the data items in response to determining that the first metadata attribute comprises a second value indicating that data collection is disabled.

13. The method of claim 12, wherein the obtaining the data item information and the obtaining the metadata comprises obtaining the data item information and the metadata periodically.

14. The method of claim 10, further comprising:
obtaining, by the data historian system, other data item information and other metadata from a program file stored separately from the industrial controller, wherein the program file defines a control program capable of execution on the industrial controller; and
updating, by the data historian system, the configuration of the data historian system based on the other data item information and the other metadata.

15. The method of claim 10, further comprising:
rendering, by the data historian system, a graphical interface display that displays information relating to the data items defined on the one or more industrial controllers.

16. The method of claim 15, wherein the rendering comprises rendering, on the graphical interface display for each of the data items, at least a name of the data item, a description of the data item, a value of one of the first metadata attributes associated with the data item, and a value of one of the second metadata attributes associated with the data item.

17. The method of claim 16, further comprising:
receiving, by the data historian system, a filter command input via interaction with a filter control; and in response to the receiving, filtering the information relating to the data items according to a value of at least one of the first metadata attributes or the second metadata attributes.

18. A non-transitory computer-readable medium having stored thereon instructions that, in response to execution, cause a data historian system comprising a processor to perform operations, the operations comprising:
- establishing data communication with one or more industrial controllers via at least one network device;
- reading, via the at least one network device, data item information from an industrial controller of the one or more industrial controllers, wherein the data item information identifies a set of data items defined on the industrial controller, and the data items comprise at least one of data tags or data logs;
- reading, from the industrial controller via the at least one network device, metadata respectively associated with the set of data items, wherein the metadata comprises, for each data item of the set of data items, at least a first metadata attribute defining whether data collection is enabled for the data item and a second metadata attribute defining a data collection rate for the data item;
- identifying, based on the metadata, a subset of the data items having an associated first metadata attribute that is set to a value indicating that data collection is enabled; and
- configuring, based on the metadata, the data historian system to collect and store data associated with the subset of the data items according to respective data collection rates defined by second metadata attributes associated with the subset of the data items.

19. The non-transitory computer-readable medium of claim 18, the operations further comprising:
- reading, from the industrial controller via the at least one network device, another metadata attribute associated with at least one data item of the subset of the data items, wherein the other metadata attribute comprises at least one of a data storage location for the at least one data item, a maximum data value of the at least one data item to be stored by the data historian system, or a minimum data value of the at least one data item to be stored by the data historian system; and
- configuring the data historian system in accordance with the other metadata.

20. The non-transitory computer-readable medium of claim 18, wherein the operations further comprise:
- detecting that the first metadata attribute associated with one of the subset of the data items has changed to a value indicating that data collection is disabled; and
- in response to the detecting, configuring the data historian system to cease collection and storage of data associated with the one of the subset of the data item.

* * * * *